(12) United States Patent
Toyama et al.

(10) Patent No.: US 11,914,172 B2
(45) Date of Patent: Feb. 27, 2024

(54) LIGHT ABSORBING BODY-CONTAINING FILM AND BACKLIGHT UNIT

(71) Applicant: FUJIFILM Corporation, Tokyo (JP)

(72) Inventors: Hirofumi Toyama, Kanagawa (JP); Tatsuya Oba, Kanagawa (JP); Takashi Yonemoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 28 days.

(21) Appl. No.: 17/376,731

(22) Filed: Jul. 15, 2021

(65) Prior Publication Data

US 2021/0341652 A1    Nov. 4, 2021

Related U.S. Application Data

(63) Continuation of application No. 16/394,704, filed on Apr. 25, 2019, now abandoned, which is a
(Continued)

(30) Foreign Application Priority Data

| Nov. 7, 2016 | (JP) | 2016-217547 |
| Nov. 30, 2016 | (JP) | 2016-232101 |
| May 16, 2017 | (JP) | 2017-097156 |

(51) Int. Cl.
*G02B 5/00* (2006.01)
*B82Y 20/00* (2011.01)
(Continued)

(52) U.S. Cl.
CPC ............. *G02B 5/003* (2013.01); *B82Y 20/00* (2013.01); *G02B 5/20* (2013.01); *G02B 5/0242* (2013.01);
(Continued)

(58) Field of Classification Search
CPC ........ G02B 5/003; G02B 5/20; G02B 5/0242; B82Y 20/00; G02F 1/133603;
(Continued)

(56) References Cited

U.S. PATENT DOCUMENTS

2010/0079704 A1\* 4/2010 Cho ................. G02F 1/133617
349/71
2011/0128471 A1    6/2011 Suckling et al.
(Continued)

FOREIGN PATENT DOCUMENTS

| CN | 203517494 U | 4/2014 |
| CN | 105402640 A | 3/2016 |

(Continued)

OTHER PUBLICATIONS

International Search Report Issued in PCT/JP2017/039925 dated Feb. 6, 2018.
(Continued)

*Primary Examiner* — George G. King
(74) *Attorney, Agent, or Firm* — Edwards Neils LLC; Jean C. Edwards, Esq.

(57) ABSTRACT

Provided are a light absorbing material-containing film which contains quantum dots or the like and is capable of suppressing in-plane luminance unevenness and chromaticity unevenness; and a backlight unit. The light absorbing material-containing film includes a light absorbing material-containing layer that has a plurality of cylindrical or polygonal prism-shaped resin portions discretely disposed and a light absorption region contain light absorbing bodies and formed between the plurality of resin portions; a first substrate film that is laminated on one main surface of the light absorbing material-containing layer; and a second substrate film laminated on the other main surface of the light absorbing material-containing layer, where the light absorption
(Continued)

region contains at least one phosphor that serves as the light absorbing body, and a binder.

4 Claims, 11 Drawing Sheets

Related U.S. Application Data continuation of application No. PCT/JP2017/039925, filed on Nov. 6, 2017.

(51) Int. Cl.
*G02B 5/20* (2006.01)
*G02B 5/02* (2006.01)
*G02F 1/1335* (2006.01)
*G02F 1/13357* (2006.01)

(52) U.S. Cl.
CPC .. *G02F 1/133603* (2013.01); *G02F 1/133606* (2013.01); *G02F 1/133611* (2013.01); *G02F 1/133614* (2021.01)

(58) Field of Classification Search
CPC ......... G02F 1/133606; G02F 1/133611; G02F 1/133614
See application file for complete search history.

(56) References Cited

U.S. PATENT DOCUMENTS

| | | | | |
|---|---|---|---|---|
| 2012/0113672 | A1* | 5/2012 | Dubrow | B32B 5/16 |
| | | | | 977/774 |
| 2013/0271955 | A1* | 10/2013 | Van Bommel | F21V 13/08 |
| | | | | 362/84 |
| 2014/0158982 | A1* | 6/2014 | Park | H01L 33/06 |
| | | | | 438/27 |
| 2014/0168576 | A1 | 6/2014 | Lee | |
| 2015/0048403 | A1 | 2/2015 | Dan et al. | |
| 2017/0198149 | A1 | 7/2017 | Yamada et al. | |
| 2017/0321114 | A1* | 11/2017 | Kamo | C09D 201/00 |
| 2018/0112129 | A1* | 4/2018 | Chen | H01L 33/56 |
| 2018/0371315 | A1 | 12/2018 | Hofmann et al. | |

FOREIGN PATENT DOCUMENTS

| | | | | |
|---|---|---|---|---|
| CN | 105864723 A | | 8/2016 | |
| JP | 2016-146460 A | | 8/2016 | |
| JP | 2016141742 A | * | 8/2016 | .......... C09D 101/02 |
| JP | 2016-194558 A | | 11/2016 | |
| JP | 2016-194989 A | | 11/2016 | |
| KR | 10-2010-0129030 A | | 12/2010 | |
| KR | 2016-0047042 A | | 5/2016 | |
| TW | 201624023 A | | 7/2016 | |
| WO | 2013/157059 A1 | | 10/2013 | |
| WO | 2015/024008 A1 | | 2/2015 | |
| WO | 2016/052627 A1 | | 4/2016 | |
| WO | 2016/086416 A1 | | 6/2016 | |
| WO | 2016/125479 A1 | | 8/2016 | |
| WO | 2016/148053 A1 | | 9/2016 | |
| WO | 2017/026118 A1 | | 2/2017 | |

OTHER PUBLICATIONS

Written Opinion Issued in PCT/JP2017/039925 dated Feb. 6, 2018.
International Preliminary Report on Patentability Issued in PCT/JP2017/039925 dated May 7, 2019.
Office Action, which was issued by the Japanese Patent Office dated Jan. 28, 2020, in connection with Japanese Patent Application No. 2018-549094.
Office Action, which was issued by the State Intellectual Property Office dated Mar. 25, 2020, in connection with Chinese Patent Application No. 201780069796.8.
Office Action, which was issued by the State Intellectual Property Office dated Oct. 22, 2020, in connection with Chinese Patent Application No. 201780069796.8.
Non-Final Office Action Issued in U.S. Appl. No. 16/394,704 dated Mar. 16, 2021.
Office Action, which was issued by the State Intellectual Property Office dated May 7, 2021, in connection with Chinese Patent Application No. 201780069796.8.

* cited by examiner

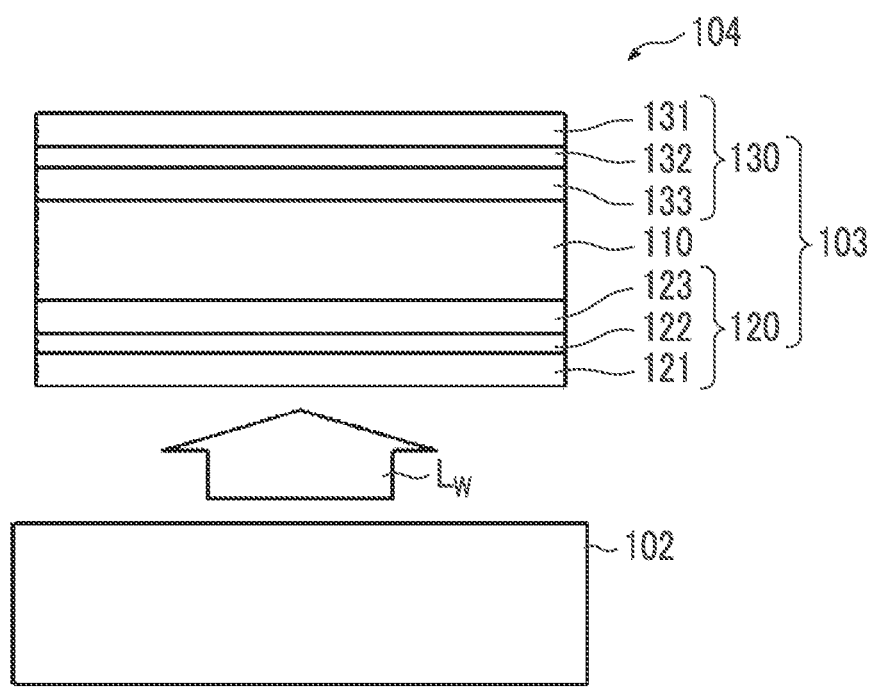

LIGHT ABSORBING BODY-CONTAINING FILM AND BACKLIGHT UNIT

CROSS-REFERENCE TO RELATED APPLICATIONS

The present application is a Continuation of U.S. patent application Ser. No. 16/394,704, filed on Apr. 25, 2019, which is a Continuation of PCT International Application No. PCT/JP2017/039925 filed on Nov. 6, 2017, which claims priority under 35 U.S.C. § 119(a) to Japanese Patent Application No. 2016-217547, filed on Nov. 7, 2016, Japanese Patent Application No. 2016-232101, filed on Nov. 30, 2016, and Japanese Patent Application No. 2017-097156, filed on May 16, 2017. The above applications are hereby expressly incorporated by reference, in their entirety, into the present application.

BACKGROUND OF THE INVENTION

1. Field of the Invention

The present invention relates to a light absorbing material-containing film including a light absorbing body (phosphor) that emits fluorescence upon irradiation with excitation light and a backlight unit comprising the light absorbing material-containing film as a wavelength conversion member.

2. Description of the Related Art

Applications of a flat panel display such as a liquid crystal display (LCD) as a space-saving image display device with low power consumption have been widespread year by year. In recent liquid crystal displays, further power saving, an enhancement in color reproducibility, or the like is required as an improvement in LCD performance.

Along with power saving of LCD backlight, in order to increase the light utilization efficiency and improve the color reproducibility, it has been proposed to use a wavelength conversion layer containing a quantum dot (QD, also referred to as a quantum point) that converts a wavelength of an incidence ray and emits the wavelength-converted light, as a luminescent material (phosphor).

The quantum dot has a state of an electron whose movement direction is restricted in all directions three-dimensionally. In a case where nanoparticles of a semiconductor are three-dimensionally surrounded by a high potential barrier, the nanoparticles become quantum dots. The quantum dot expresses various quantum effects. For example, a "quantum size effect" is expressed in which a density of electronic states (energy level) is discretized. According to this quantum size effect, the absorption wavelength and luminescence wavelength of light can be controlled by changing the size of a quantum dot.

Generally, such quantum dots are dispersed in a resin or the like, and used as a quantum dot film for wavelength conversion, for example, by being disposed between a backlight and a liquid crystal panel.

In a case where excitation light is incident from a backlight to a film containing quantum dots, the quantum dots are excited to emit fluorescence. Here, white light can be realized by using quantum dots having different luminescence properties and causing each quantum dot to emit light having a narrow half-width of red light, green light, or blue light. Since the fluorescence by the quantum dot has a narrow half-width, wavelengths can be properly selected to thereby allow the resulting white light to be designed so that the white light is high in luminance and excellent in color reproducibility.

Meanwhile, in a case where the quantum dot film disposed between the backlight and the liquid crystal panel is used, in-plane luminance unevenness and chromaticity unevenness which are not in the conventional configuration without using the quantum dot film are generated, which is a problem.

Therefore, a method of reducing unevenness caused by the quantum dot film has been proposed.

For example, KR20160047042A discloses that in quantum points for wavelength-converting excitation light to generate wavelength-converted light and a light conversion sheet including the quantum points, the blue color unevenness which occurs in the peripheral portion of the picture frame of the backlight is improved using a quantum dot film characterized in that a thickness of the surrounding light conversion layer along the four sides of the light conversion sheet is made thicker than that of the central portion.

In addition, JP2016-194989A discloses a backlight device comprising a light absorbing body which is disposed along at least a part of a peripheral edge portion of a quantum dot sheet on at least one of a light incident surface side or a light exit surface side of the quantum dot sheet and which absorbs light at least from a light source. In addition, it is disclosed that this configuration prevents the bluing of the peripheral edge portion of the light emitting region of the backlight device from becoming stronger.

In addition, WO2016/148053A discloses an illumination device comprising a wavelength conversion member having a multi-phosphor portion in which at least a part of an outer peripheral side portion has a phosphor content per unit area higher than that of a central side portion. In addition, it is disclosed that this configuration leads to suppression of difference in tint of emitted light between the outer peripheral side and the central side.

SUMMARY OF THE INVENTION

A wavelength conversion member including a light absorbing body used for an LCD is a thin film of about 50 to 350 μm. In such a very thin film, it is difficult to control the thickness of the surrounding light conversion layer along the four sides according to the blue color unevenness of the backlight, and the productivity is poor. In particular, it is not able to be wound long in order to increase the thickness of the end portion, and roll-to-roll production could not be made, thus resulting in poor productivity.

Further, in the configuration in which the light absorbing body is disposed on the peripheral edge portion of the quantum dot sheet as in JP2016-194989A, there is a problem that the peripheral edge portion becomes dark in a case of being incorporated in the backlight. In addition, since the quantum dots at the end portion are deteriorated by photo-irradiation for a long time, there is a problem that blue light leakage occurs from the periphery of the backlight with time and color unevenness occurs.

In addition, even in the configuration in which the concentration of the quantum dots in the outer peripheral side portion of the wavelength conversion member is increased as in WO2016/148053A, since the quantum dots at the end portion are deteriorated by photo-irradiation for a long time, there is a problem that blue light leakage occurs from the periphery of the backlight with time and color unevenness occurs.

The present invention has been made in view of the above circumstances, and an object of the present invention is to provide a light absorbing material-containing film which contains quantum dots or the like and is capable of suppressing in-plane luminance unevenness and chromaticity unevenness; and a backlight unit comprising the light absorbing material-containing film as a wavelength conversion member.

In a further preferred aspect, an object of the present invention is to provide a light absorbing material-containing film which is capable of suppressing in-plane tint unevenness, particularly blue light leakage from the surroundings, in the initial stage and after aging; and a backlight unit.

As a result of extensive studies to achieve the foregoing object, the present inventors have found that the foregoing object can be achieved by giving in-plane distribution to a size or thickness of a light absorption region in a light absorbing material-containing film including a light absorbing material-containing layer that has a resin layer in which one or a plurality of concave portions discretely disposed are formed and a plurality of light absorption regions which contain light absorbing bodies and are disposed in the concave portions formed in the resin layer, a first substrate film that is laminated on one main surface of the light absorbing material-containing layer, and a second substrate film that is laminated on the other main surface of the light absorbing material-containing layer, in which the light absorption region contains at least one phosphor that serves as the light absorbing body, and a binder, and the resin layer has a modulus of elasticity of 0.5 to 10 GPa. The present invention has been completed based on these findings.

In addition, the present inventors have found that the foregoing object can be achieved by taking a configuration in which a light absorbing material-containing film includes a first substrate film and a second substrate film, which are disposed to be spaced from each other such that main surfaces thereof face each other, a light absorption region which is provided between the first substrate film and the second substrate film and contains a first light absorbing body, and a frame which is provided so as to surround the light absorption region between the first substrate film and the second substrate film and contains a second light absorbing body different from the first light absorbing body, in which the frame has an oxygen permeability of 20 cc/(m²·day·atm) or less. The present invention has been completed based on these findings.

That is, it has been found that the foregoing object can be achieved by the following configuration.

[1] A light absorbing material-containing film comprising:
a light absorbing material-containing layer that has a resin layer in which one or a plurality of concave portions discretely disposed are formed and a plurality of light absorption regions which contain light absorbing bodies and are disposed in the concave portions formed in the resin layer;
a first substrate film that is laminated on one main surface of the light absorbing material-containing layer; and
a second substrate film that is laminated on the other main surface of the light absorbing material-containing layer,
in which the light absorption region contains at least one phosphor that serves as the light absorbing body, and a binder,
the resin layer has a modulus of elasticity of 0.5 to 10 GPa, and
an in-plane tint distribution of the light absorbing material-containing film satisfies Formula (1), $$0.002 < y_{max} - y_{min} < 0.2 \quad \text{Formula (1)}$$

in the formula, $y_{max}$ and $y_{min}$ respectively represent a maximum value and a minimum value of a CIE y value in a measurement of an in-plane tint of the light absorbing material-containing film.

[2] The light absorbing material-containing film according to [1], in which a thickness of the light absorption region has an in-plane distribution.

[3] The light absorbing material-containing film according to [2], in which the thickness of the light absorption region is thicker at a peripheral portion than at a center in a plane direction.

[4] The light absorbing material-containing film according to any one of [1] to [3], in which an area of the light absorption region with respect to a total area of the light absorption region and the resin layer surrounding the light absorption region has an in-plane distribution.

[5] The light absorbing material-containing film according to [4], in which the area of the light absorption region with respect to the total area of the light absorption region and the resin layer surrounding the light absorption region is larger in the peripheral portion than in the center in the plane direction.

[6] The light absorbing material-containing film according to any one of [1] to [5], in which the light absorbing material-containing layer contains two or more different types of phosphors or coloring agents as light absorbing bodies.

[7] The light absorbing material-containing film according to any one of [1] to [6], in which the resin layer has an oxygen permeability of 10 cc/(m²·day·atm) or less.

[8] A light absorbing material-containing film comprising:
a first substrate film and a second substrate film, which are disposed to be spaced from each other such that main surfaces thereof face each other;
a light absorption region which is provided between the first substrate film and the second substrate film and contains a first light absorbing body; and
a frame which is provided so as to surround the light absorption region between the first substrate film and the second substrate film and contains a second light absorbing body different from the first light absorbing body,
in which the frame has an oxygen permeability of 20 cc/(m²·day·atm) or less.

[9] The light absorbing material-containing film according to [8], which has a region where the thickness of the light absorption region continuously changes at a position where the frame and the light absorption region are in contact with each other in a case of observing a cross section in a thickness direction of the light absorbing material-containing film.

[10] The light absorbing material-containing film according to [8] or [9], in which the second light absorbing body absorbs at least one of ultraviolet light or blue light to emit yellow light.

[11] The light absorbing material-containing film according to any one of [8] to [10], in which the first light absorbing body is a quantum dot.

[12] The light absorbing material-containing film according to any one of [8] to [11], in which multiple frames are provided so that a plurality of frames having different sizes are provided and a large frame encloses a small frame.

[13] The light absorbing material-containing film according to [12], in which the light absorption region is also provided between a plurality of multiple frames provided.

[14] The light absorbing material-containing film according to [12] or [13], in which at least one of an absorbance or an amount of luminescence of the second light absorbing body contained in the frame gradually decreases from a larger frame to a smaller frame.

[15] The light absorbing material-containing film according to any one of [8] to [14], in which the frame has a width of 0.1 to 5 mm.

[16] A backlight unit comprising:
  a wavelength conversion member including the light absorbing material-containing film according to any one of [1] to [15]; and
  at least one of a blue light-emitting diode or an ultraviolet light-emitting diode.

According to the present invention, it is possible to provide a light absorbing material-containing film which contains quantum dots or the like and is capable of suppressing in-plane luminance unevenness and chromaticity unevenness; and a backlight unit comprising the light absorbing material-containing film as a wavelength conversion member.

In a further preferred aspect, it is possible to provide a light absorbing material-containing film which is capable of suppressing in-plane tint unevenness, particularly blue light leakage from the surroundings, in the initial stage and after aging; and a backlight unit.

BRIEF DESCRIPTION OF THE DRAWINGS

FIG. 22 is a cross-sectional view of a schematic configuration of a liquid crystal display comprising a backlight unit.

DESCRIPTION OF THE PREFERRED EMBODIMENTS

Figure 1:
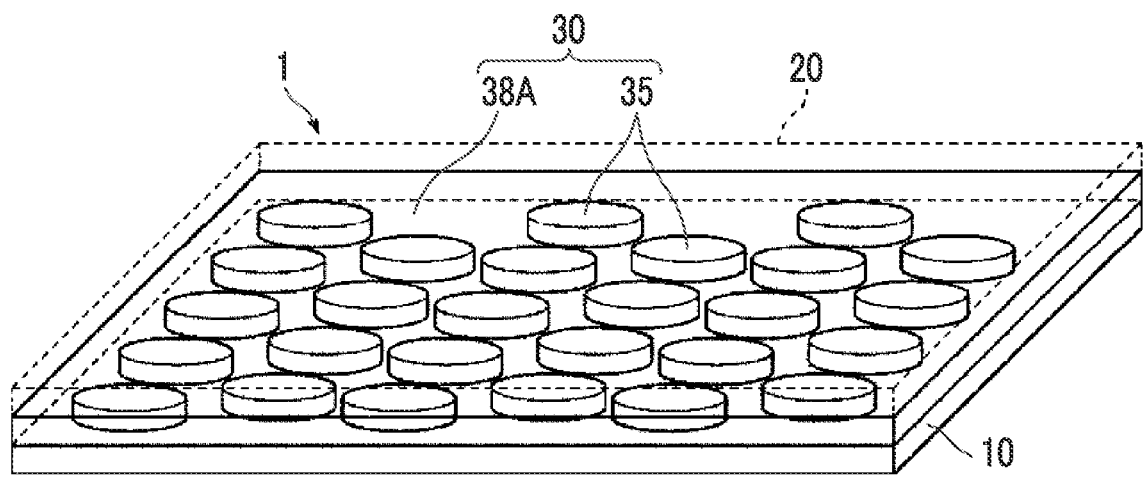
FIG. 1 is a perspective view schematically showing an example of a light absorbing material-containing film of a first aspect of the present invention.

Hereinafter, embodiments of a light absorbing material-containing film and a backlight unit comprising the light absorbing material-containing film according to the embodiment of the present invention will be described with reference to the accompanying drawings. In the drawings of the present specification, the scale of each part is appropriately changed for easy visual recognition. In the present specification, the numerical range expressed by using "to" means a range including numerical values described before and after "to" as a lower limit value and an upper limit value, respectively.

Further, in the present specification, the term "(meth)acrylate" refers to at least one or any one of acrylate or methacrylate. The same applies to "(meth)acryloyl" and the like.

<Light Absorbing Body-Containing Film (First Aspect)>

The light absorbing material-containing film of the first aspect of the present invention is a light absorbing material-containing film including:
  a light absorbing material-containing layer that has a resin layer in which one or a plurality of concave portions discretely disposed are formed and a plurality of light absorption regions which contain light absorbing bodies and are disposed in the concave portions formed in the resin layer;
  a first substrate film that is laminated on one main surface of the light absorbing material-containing layer; and
  a second substrate film that is laminated on the other main surface of the light absorbing material-containing layer,
  in which the light absorption region contains at least one phosphor that serves as the light absorbing body, and a binder,
  the resin layer has a modulus of elasticity of 0.5 to 10 GPa, and
  an in-plane tint distribution of the light absorbing material-containing film satisfies Formula (1), $$0.002 < y_{max} - y_{min} < 0.2 \qquad \text{Formula (1)}$$

in the formula, $y_{max}$ and $y_{min}$ respectively represent a maximum value and a minimum value of a CIE y value in a measurement of an in-plane tint of the light absorbing material-containing film.

For example, $y_{max}$ and $y_{min}$ may be measured by the following method.

First, the film is cut into a size of 30 mm×30 mm at an interval of 40 mm so as to include the film center portion of the prepared light absorbing body-containing film.

Next, a backlight unit is taken out by disassembling a commercially available tablet terminal comprising a blue light source in the backlight unit (for example, trade name "Kindle (registered trademark) Fire HDX 7", manufactured by Amazon, hereinafter sometimes simply referred to as "Kindle Fire HDX 7"). The wavelength conversion film, Quantum Dot Enhancement Film (QDEF) incorporated into the backlight unit is taken out and a cut light absorbing body-containing film of 30 mm×30 mm size is incorporated into the central portion of the screen.

The backlight unit is turned on and the tint (CIE x, CIE y) of luminescence of the light absorbing material-containing film is measured with a luminance meter (for example, trade name "SR3", manufactured by Topcon Corporation) installed at a position 520 mm in the direction perpendicular to the surface of the light guide plate.

$y_{max}-y_{min}$ is calculated with $y_{max}$ being the one having the largest CIE y value and $y_{min}$ being the one having the smallest CIE y value, among the measured tints.

The light absorbing material-containing film can impart a tint distribution so as to compensate for color unevenness in a case of being incorporated into a backlight.

For example, in a side edge type backlight unit using a quantum dot film, a phenomenon is observed in which blue light leaks from four sides (end portions in the plane direction) to cause color unevenness. In this case, tint unevenness of the backlight can be reduced by making the tint of the four sides of the film yellow with respect to the central portion of the film. As an example, at least one of the thickness of the light absorption region (the depth of the concave portion), the width of the resin layer between adjacent light absorption regions, or the concentration (content) of the light absorbing body in the light absorption region is adjusted to increase the amount of quantum dots per unit area, so that tint distribution can be imparted to reduce tint unevenness of the backlight at the peripheral portion of the film as compared with the central portion of the film.

In a case where the light absorbing material-containing film is used in a backlight from which blue light leaks from the surroundings, using a quantum dot film, it is preferred that the light absorbing material-containing film has a blue tint in the central portion and a yellow tint in the surroundings. That is, it is preferred that y_edge>y_CT is satisfied in a case where the CIE y value of the central portion of the film is taken as y_CT and the CIE y value of the peripheral portion of the film is taken as y_edge.

Further, in a direct backlight mode backlight unit using a quantum dot film, unevenness due to the illuminance distribution corresponding to the arrangement of blue LEDs may be observed in some cases. In this case, it is possible to obtain a backlight with uniform tint by imparting a tint distribution to the light absorbing material-containing film so as to compensate for the illuminance distribution.

Figure 2:
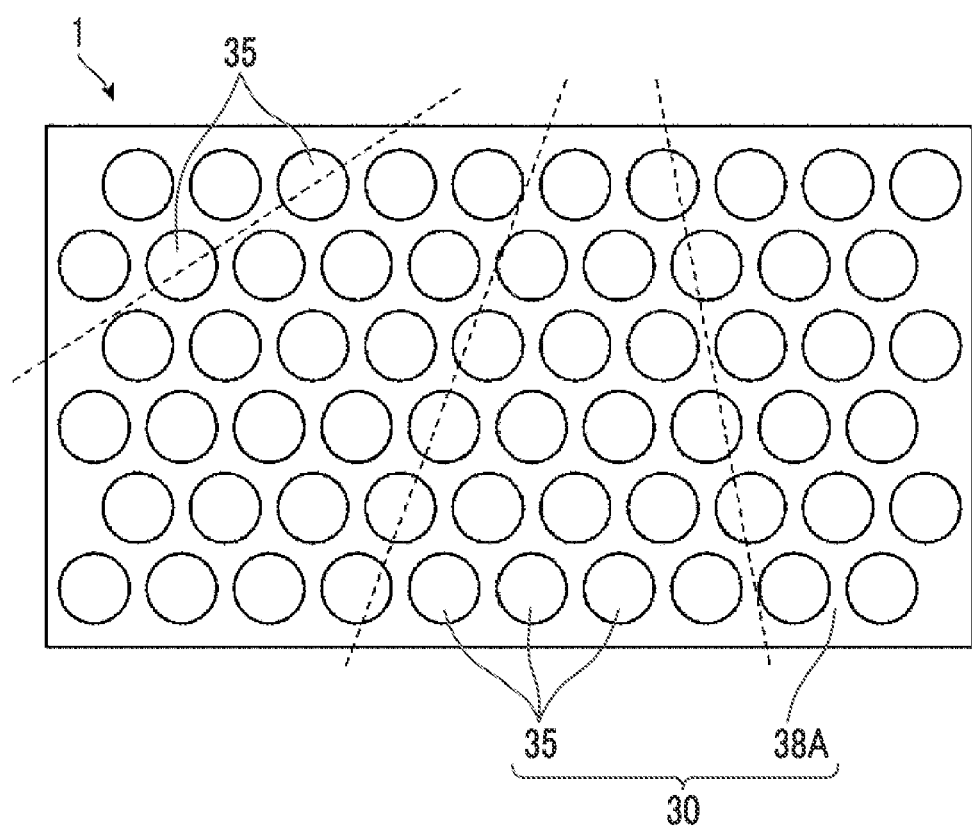
FIG. 2 is a plan view of the light absorbing material-containing film of FIG. 1.
Figure 3:
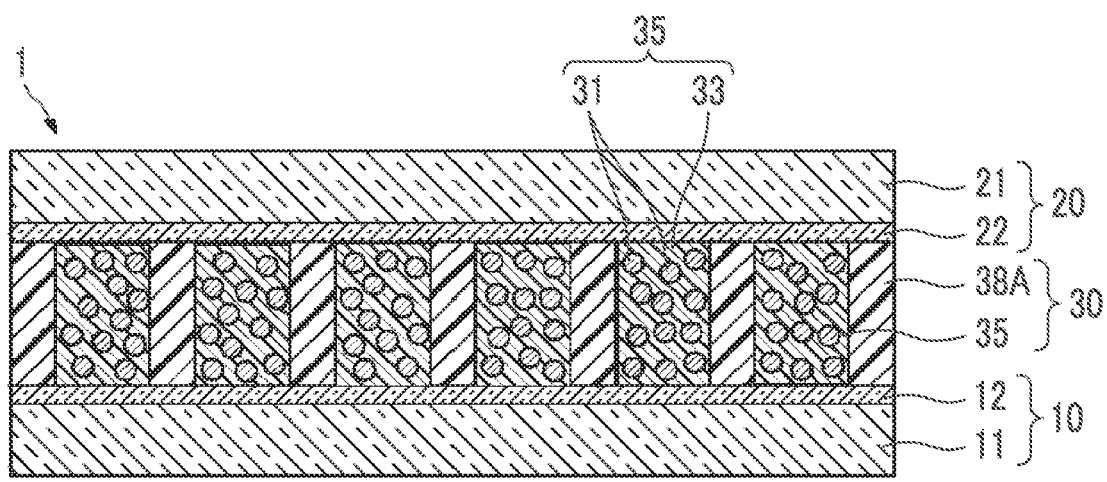
FIG. 3 is a cross-sectional view of the light absorbing material-containing film of FIG. 1.

FIG. 1 is a perspective view schematically showing an example of a light absorbing material-containing film 1 according to the first aspect of the present invention, FIG. 2 is a plan view of FIG. 1, and FIG. 3 is a cross-sectional view of FIG. 1. For the sake of explanation in FIG. 1, a second substrate film 20 is indicated by a broken line and a light absorbing material-containing layer 30 is indicated by a solid line.

The light absorbing material-containing film 1 of the present embodiment comprises a first substrate film 10, a light absorbing material-containing layer 30 in which a plurality of regions 35 including a light absorbing body 31 are discretely disposed on the first substrate film 10, and a resin layer 38A is disposed between the regions 35 including the light absorbing body 31, and a second substrate film 20 disposed on the light absorbing material-containing layer 30. Hereinafter, the region 35 including the light absorbing body 31 may be referred to as a light absorption region 35 in some cases.

The light absorption region 35 is provided in a concave portion formed in the resin layer 38A.

In a preferred aspect, the resin layer 38A has impermeability to oxygen.

The phrase "having impermeability to oxygen" in the present specification means that an oxygen permeability is 20 cc/(m²·day·atm) or less. The phrase "having impermeability" and the phrase "having barrier properties" in the present specification are used synonymously. That is, in the present specification, a gas barrier means having impermeability to a gas, and a water vapor barrier means having impermeability to water vapor. Further, a layer having impermeability to both of oxygen and water vapor is referred to as a "barrier layer".

Here, in the light absorbing material-containing film of the first aspect, the light absorption region 35 has a width of 10 to 1000 μm and a depth of 1 to 150 μm, and the resin layer 38A has a width of 5 to 1000 μm and a depth of 1 to 150 μm.

As described above, in order to produce a light absorbing material-containing film containing a light absorbing body such as a quantum dot with high production efficiency, preferred is a method in which a coating step and a curing step are sequentially carried out on a long film by a roll-to-roll method to form a laminated structure which is then cut into a desired size.

In the light absorbing material-containing film according to the embodiment of the present invention, there is an in-plane distribution in at least one of the depth of the concave portion of the resin layer 38A, the width of the resin layer 38A between adjacent light absorption regions 35, or the concentration of the light absorbing body contained in the plurality of light absorption regions 35.

For example, it possible to prepare a film having a desired in-plane distribution with satisfactory accuracy by providing the resin layer 38A having a plurality of discretely disposed concave portions formed thereon and adjusting the depth of the concave portion and/or the width of the resin layer 38A between the concave portions in the plane. As a result, it is possible to effectively reduce in-plane unevenness in a case where a wavelength conversion member is used for an LCD. Particularly, by making the thickness of the resin layer and the light absorption region uniform and providing in-plane distribution in the width, it becomes possible to prepare a desired light absorbing body film without causing winding misalignment by roll-to-roll.

As described above, the light absorbing material-containing film according to the embodiment of the present invention includes the resin layer 38A in which one or a plurality of concave portions disposed discretely are formed, and has an in-plane distribution in at least one of the depth of the concave portion of the resin layer 38A, the width of the resin layer 38A between adjacent light absorption regions 35, or the concentration of the light absorbing body contained in the light absorption region 35.

Figure 4:
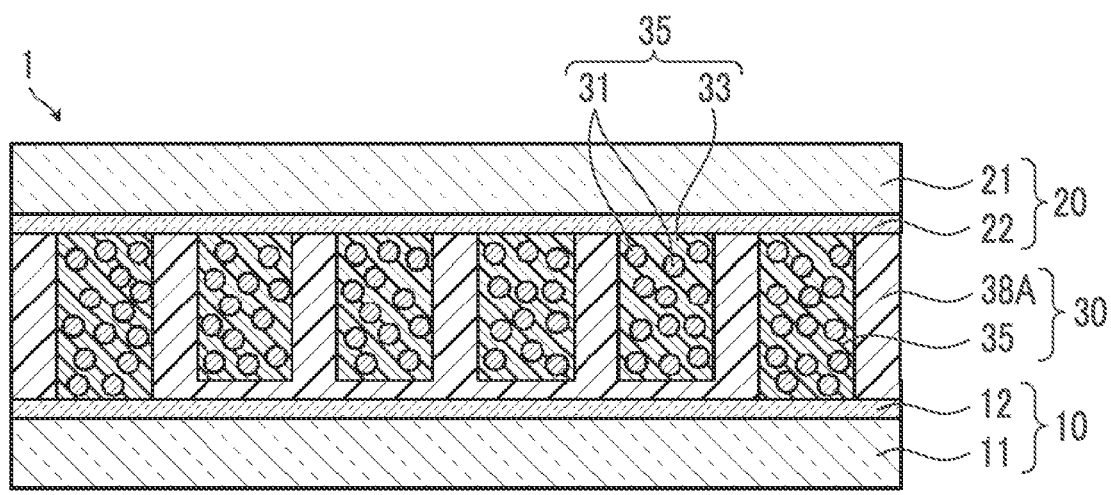
FIG. 4 is a cross-sectional view for explaining an example of the light absorbing material-containing film of the present invention.

For example, as described above, in a case where blue light leaks from four sides (end portions in the plane direction) to cause color unevenness, as conceptually shown in FIG. 4, the thickness of the light absorption region 35 in the peripheral portion is made thicker than the central portion. That is, the depth of the concave portion of the resin layer 38A to be the light absorption region 35 is made deeper at the peripheral portion than at the central portion.

This makes it possible to increase the amount of the light absorbing body 31 in the peripheral portion as compared with the central portion to increase the amount of luminescence, whereby it is possible to have a tint distribution with different tints in the peripheral portion and the central portion. For example, in a case where a quantum dot that emits red light and green light by the incidence of blue light is used as the light absorbing body 31, the yellow tint in the peripheral portion becomes stronger as compared with the central portion, and as a result, color unevenness due to the leakage of blue light can be canceled out so that uniform luminescence without color unevenness can be carried out.

It should be noted that the difference in the depth (thickness) between the central portion and the peripheral portion may be set appropriately according to the color unevenness of the peripheral portion, so that the color unevenness can be canceled out.

In the present invention, the peripheral portion of the light absorbing material-containing film refers to a region from 0.05 to 10 mm from the end portion, and preferably from 0.1 to 5 mm from the end portion.

Figure 5:
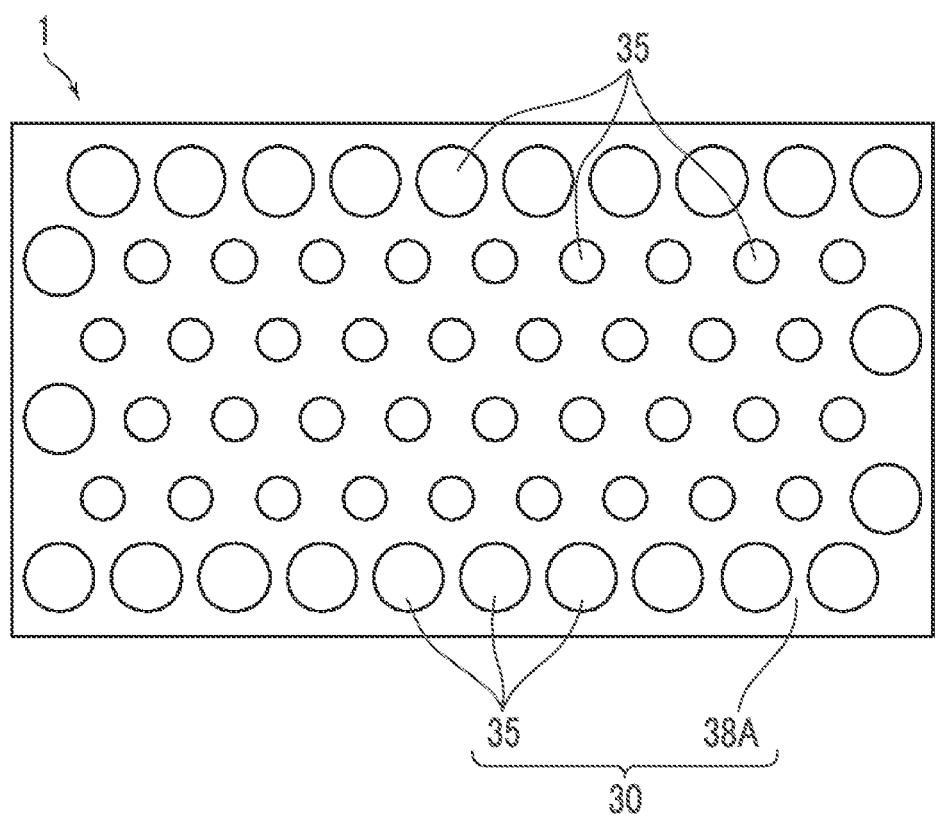
FIG. 5 is a plan view for explaining another example of the light absorbing material-containing film of the present invention.

As another method, as conceptually shown in FIG. 5, the area of the light absorption region 35 with respect to the total area of the light absorption region 35 and the resin layer 38A surrounding the light absorption region 35 is made larger in the peripheral portion than in the central portion. That is, the relative area of the light absorption region 35 is made larger in the peripheral portion than in the central portion.

Thereby, similarly to the above, the amount of the light absorbing body 31 in the peripheral portion is increased as compared with the central portion to increase the amount of luminescence, whereby it is possible to have a tint distribution with different tints in the peripheral portion and the central portion so that uniform luminescence without color unevenness can be carried out.

It should be noted that the difference in the width of the resin layer 38A between the adjacent light absorption regions 35 in the central portion and the peripheral portion may be set appropriately according to the color unevenness of the peripheral portion, so that the color unevenness can be canceled out.

The resin layer 38A surrounding the light absorption region 35 indicates the smallest region having the same shape as the light absorption region 35, which is in contact with the adjacent light absorption region in alignment with the light absorption region 35 at the center.

For example, as shown in FIG. 5, in a case where the light absorption region 35 is circular, the resin layer 38A in the smallest circular region in contact with the adjacent light absorption region 35 coinciding in center with the corresponding light absorption region 35 is defined as a resin layer 38A surrounding the light absorption region 35.

Figure 6:
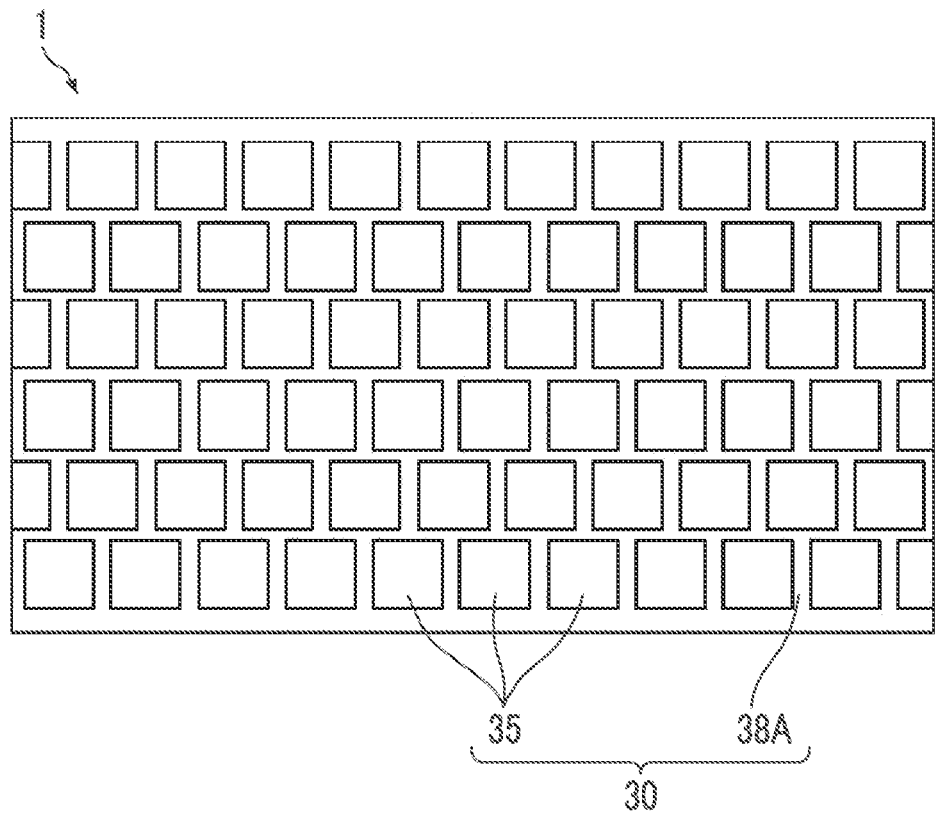
FIG. 6 is a plan view showing another example of a plan view pattern of a light absorption region.

Alternatively, as shown in FIG. 6, in a case where the light absorption region 35 is quadrangular, the resin layer 38A in the smallest quadrangular region of the same shape in contact with the adjacent light absorption region 35 coinciding in center with the corresponding light absorption region 35 is defined as a resin layer 38A surrounding the light absorption region 35.

Furthermore, as another method, the concentration of the light absorbing body 31 in the light absorption region 35 is made higher in the peripheral portion than in the central portion. That is, the amount of the light absorbing body 31 with respect to the total amount (mass or volume) of the light absorbing body 31 and the binder 33 in the light absorption region 35 is made larger in the peripheral portion than in the central portion.

Thereby, similarly to the above, the amount of the light absorbing body 31 in the peripheral portion is increased as compared with the central portion to increase the amount of luminescence, whereby it is possible to have a tint distribution with different tints in the peripheral portion and the central portion so that uniform luminescence can be carried out.

It should be noted that the difference in the concentration of the light absorbing body 31 in the light absorption region 35 between the central portion and the peripheral portion may be set appropriately according to the color unevenness of the peripheral portion, so that the color unevenness can be canceled out.

In each of the above examples, the amount of the light absorbing body 31 is made larger in the light absorption region 35 of the peripheral portion than in that of the central portion, in response to the leakage of blue light from the peripheral portion, but the present invention is not limited thereto, and a variety of configurations can be used in response to color unevenness occurring in a backlight unit or the like using the light absorbing material-containing film according to the embodiment of the present invention.

For example, in a case where spot-like color unevenness and/or luminance unevenness partially occurs in the backlight unit, in a region where this spot-like color unevenness and/or luminance unevenness occurs, the color unevenness and/or luminance unevenness may be canceled out by increasing or decreasing the thickness of the light absorption region 35, increasing or decreasing the width of the relative area of the light absorption region 35, and increasing or decreasing the concentration of the light absorbing body in the light absorption region 35.

The adjustment of the thickness of the light absorption region 35, the adjustment of the relative area of the light absorption region 35, and the adjustment of the concentration of the light absorbing body in the light absorption region 35, for adjusting the amount of the light absorbing body 31, may be carried out individually, or two methods or three methods may be used in combination.

Figure 7:
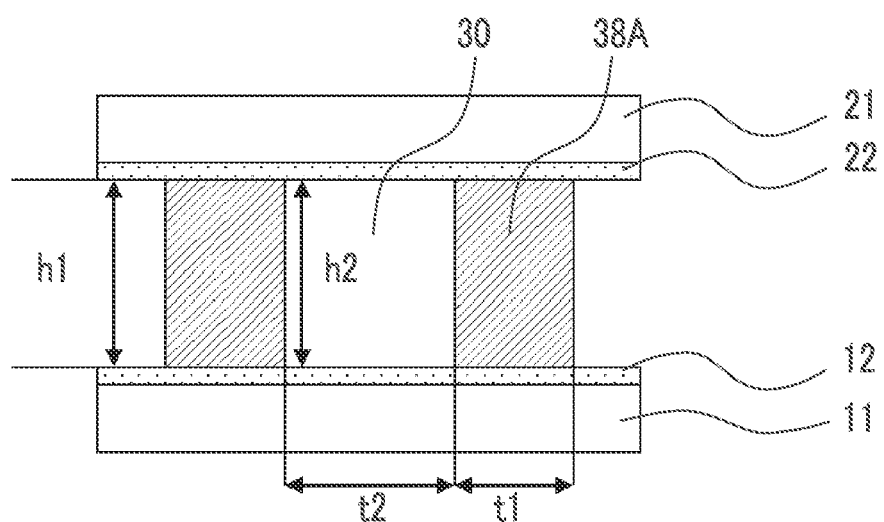
FIG. 7 is a view for explaining a width t1 and a depth h1 of a resin layer, and a width t2 and a height h2 of a light absorption region.

Here, although the target chromaticity can be reached in a case where the height (film thickness) h2 (see FIG. 7) of the light absorption region 35 is 1 μm or more, it is preferable to have a film thickness of a certain level or more since the influence of the film thickness unevenness becomes large. On the other hand, in a case where the film thickness of the light absorption region 35 is too large, the amount of light absorption increases and therefore the initial luminance may decrease. From these viewpoints, the height h2 of the light absorption region 35 is 1 to 150 μm, preferably 5 to 80 μm, and more preferably 10 to 50 μm.

In addition, it is preferred that the width t1 (see FIG. 7) of the resin layer 38A portion is made thin to prevent the resin layer 38A from being visually recognized. On the other hand, from the viewpoint of strength and durability, a certain width or more is required. From these viewpoints, the width t1 of the resin layer 38A is 5 to 1000 μm, preferably 10 to 500 μm, and more preferably 15 to 300 μm.

The depth h1 of the resin layer and the height h2 of the light absorption region are determined in such a manner that the light absorbing material-containing film is cut with a microtome to form a cross section; the light absorbing material-containing layer is irradiated with excitation light to cause the light absorbing body to emit light; in this state, this cross section is observed with a confocal laser microscope; and ten places are extracted and the depth thereof is measured and the measured values are averaged.

The thickness t1 of the resin layer 38A is the shortest distance between the adjacent light absorption regions 35, and is determined in such a manner that the light absorbing material-containing layer is irradiated with excitation light to cause the phosphor in the light absorbing material-containing layer to emit light; in this state, the surface is observed from one surface of the light absorbing material-containing film using a confocal laser microscope; at least 20 places of the resin layer 38A between the adjacent light absorption regions 35 are extracted and the width thereof is read; and the average value of these read values is calculated as the width t1.

Further, the first substrate film 10 and the second substrate film 20 are preferably impermeable to oxygen and may have a laminated structure of a support film (11, 21) and a barrier layer (12, 22) having impermeability to oxygen as shown in FIG. 3.

In addition, the size and arrangement pattern of the light absorption region 35 are not particularly limited and may be appropriately designed according to desired conditions. Further, for example, in a case where the printing method is used as one of the methods for forming a light absorption region to be described later, there is also a restriction that printing cannot be carried out unless the individual occupied area (in plan view) is not less than a certain size. In consideration of these factors, a desired shape, size, and arrangement pattern may be designed.

Figure 8:
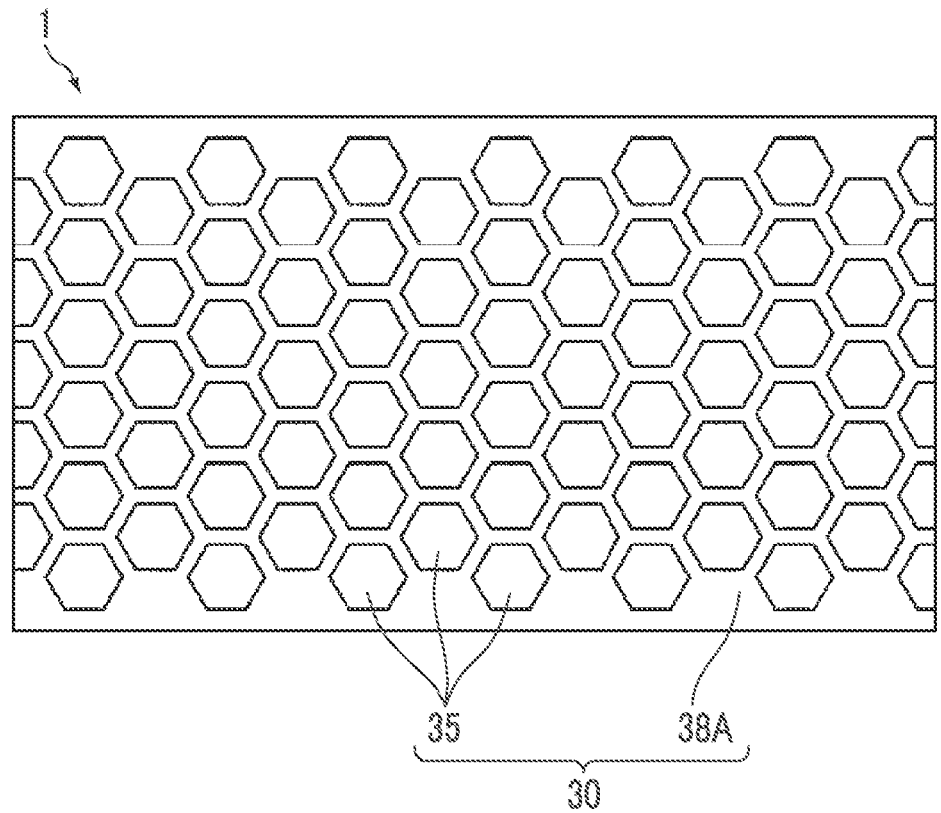
FIG. 8 is a plan view showing another example of the plan view pattern of the light absorption region.
Figure 9:
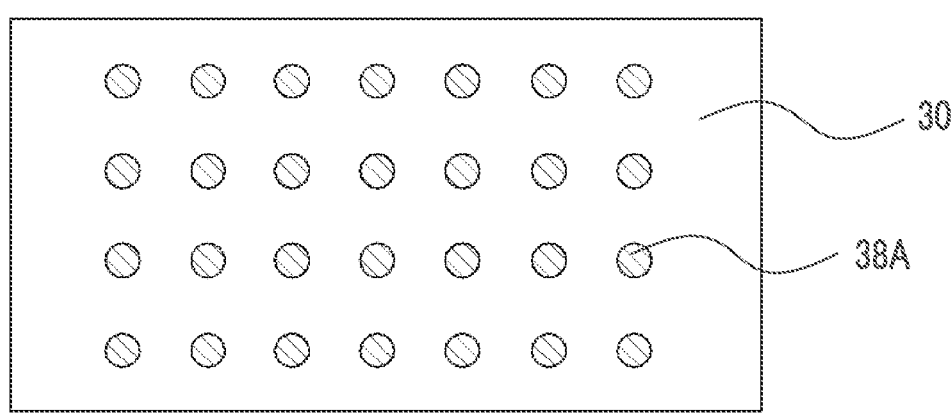
FIG. 9 is a plan view showing another example of the light absorbing material-containing film.

In the above embodiment, the light absorption region 35 is columnar and is circular in plan view, but the shape of the light absorption region 35 is not particularly limited. The light absorption region 35 may be a polygonal prism or a regular polygonal prism such as a quadrangle in plan view as shown in FIG. 6, or a hexagon in plan view as shown in FIG. 8. Alternatively, as shown in FIG. 9, the resin layer 38A may have a columnar shape or a polygonal columnar shape. In the above example, the bottom surface of the cylinder or the polygonal prism is disposed parallel to the substrate film surface, but the bottom surface may not necessarily be disposed parallel to the substrate film surface. Further, the shape of light absorption region 35 may be amorphous.

The light absorbing body 31 in the light absorption region 35 may be of one type or plural types. In addition, the light absorbing body 31 in one light absorption region 35 is regarded as one type, and a region containing a first light absorbing body and a region containing a second light absorbing body different from the first light absorbing body may be disposed periodically or non-periodically in the plurality of light absorption regions 35. Three or more types of light absorbing bodies may be used.

<Light Absorbing Body-Containing Film (Second Aspect)>

The light absorbing material-containing film of the second aspect of the present invention is a light absorbing material-containing film including:

a first substrate film and a second substrate film, which are disposed to be spaced from each other such that main surfaces thereof face each other;

a light absorption region which is provided between the first substrate film and the second substrate film and contains a first light absorbing body; and a frame which is provided so as to surround the light absorption region between the first substrate film and the second substrate film and contains a second light absorbing body different from the first light absorbing body, in which the frame has an oxygen permeability of 20 cc/(m$^2$·day·atm) or less.

In the light absorbing material-containing film according to the embodiment of the present invention, a resin layer (hereinafter, referred to as a frame) is disposed in a frame shape at the peripheral portion of the film, and the frame contains a phosphor (a second light absorbing body) different from the first light absorbing body contained in the light absorption region. This second light absorbing body is used for adjusting the tint distribution in the film plane. That is, incorporation of a yellow phosphor in the frame at the peripheral portion of the film makes it possible to improve the leakage of blue light from four sides of the backlight. Further, the oxygen permeability of the frame is 20 cc/(m$^2$·day·atm) or less. Therefore, deterioration of the light absorbing body at the end portion due to long-time photo-irradiation can be suppressed, and it is therefore possible to suppress the increase in blue light leakage from the periphery of the backlight with time and the occurrence of color unevenness.

In the frame including the second light absorbing body, the width and the depth of the frame, the concentration of the light absorbing body, and the like may be adjusted so as to reduce color unevenness of the backlight.

Here, as described above, the color unevenness can be evaluated by measuring the maximum value $y_{max}$ and the minimum value $y_{min}$ of the CIE y value in a case of measuring the tint in the light absorbing material-containing film plane. It is preferred that $y_{max}$ and $y_{min}$ satisfy $0.002 < y_{max} - y_{min} < 0.2$.

In a case where the light absorbing material-containing film is used in a backlight from which blue light leaks from the surroundings, using a quantum dot as the first light absorbing body contained in the light absorption region, it is preferred that the light absorbing material-containing film has a blue tint in the central portion and a yellow tint in the surroundings. That is, it is preferred that y_edge>y_CT is satisfied in a case where the CIE y value of the central portion of the film is taken as y_CT and the CIE y value of the peripheral portion of the film is taken as y_edge.

Figure 10:
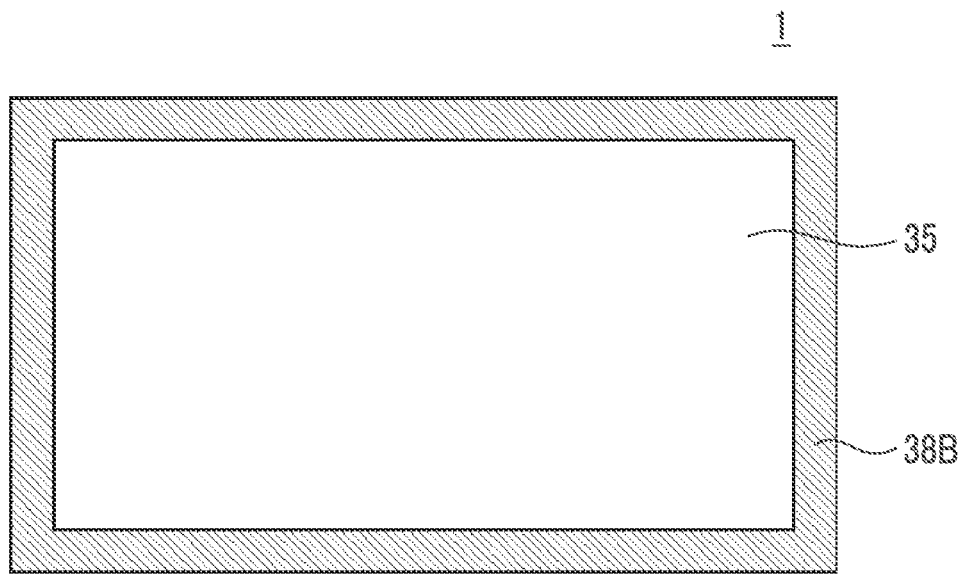
FIG. 10 is a plan view schematically showing an example of the light absorbing material-containing film of the present invention.
Figure 11:
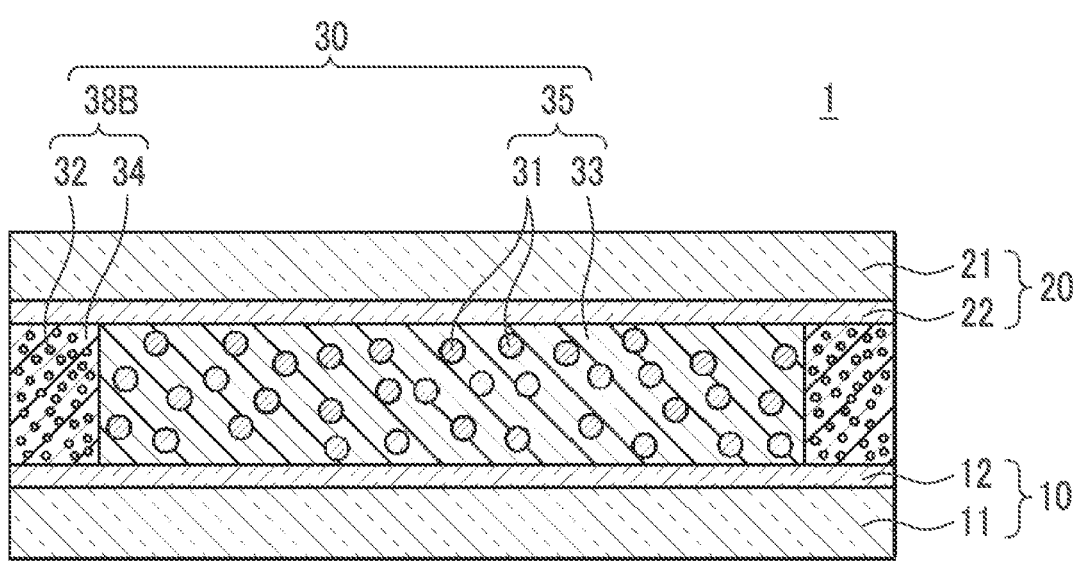
FIG. 11 is a cross-sectional view of the light absorbing material-containing film of FIG. 10.

FIG. 10 is a plan view schematically showing an example of the light absorbing material-containing film 1 according to the embodiment of the present invention, and FIG. 11 is a cross-sectional view of FIG. 10. In FIG. 10, the illustration of the second substrate film 20 is omitted for the sake of explanation.

The light absorbing material-containing film 1 shown in FIGS. 10 and 11 comprises a first substrate film 10, a light absorbing material-containing layer 30 having a region 35 including a first light absorbing body 31 disposed substantially at the center on the first substrate film 10, and a frame 38B disposed so as to surround the region 35 including the first light absorbing body 31, and a second substrate film 20 disposed on the light absorbing material-containing layer 30. The frame 38B contains a second light absorbing body 32 different from the first light absorbing body 31.

Hereinafter, the region 35 including the first light absorbing body 31 may be referred to as a light absorption region 35 in some cases. Further, the frame 38B may be referred to as a resin layer 38B in some cases.

Further, in the light absorbing material-containing film according to the embodiment of the present invention, the oxygen permeability of the frame 38B is 20 cc/(m$^2$·day·atm) or less. That is, the frame 38B has gas barrier properties.

Figure 12:
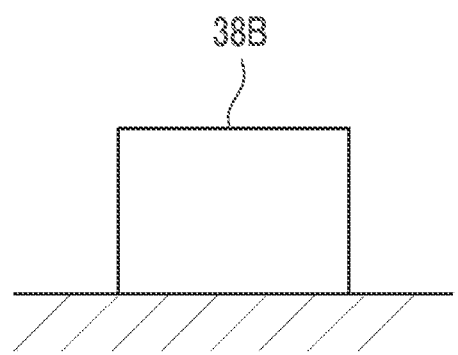
FIG. 12 is a cross-sectional view schematically showing an example of a cross-sectional shape of a frame.
Figure 13:
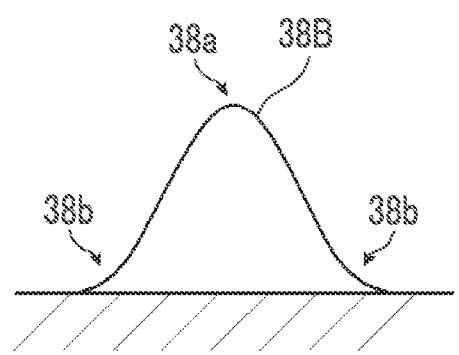
FIG. 13 is a cross-sectional view schematically showing another example of the cross-sectional shape of the frame.

Here, the cross-sectional shape of the frame portion of the frame 38B is not limited. For example, the cross-sectional shape of the frame portion of the frame 38B may have a rectangular shape as shown in FIG. 12, a triangular shape as shown in FIG. 13, a trapezoidal shape, a wave shape, or the like.

In addition, the width of the frame 38B is preferably 0.1 mm to 5 mm, more preferably 0.1 mm to 4 mm, and still more preferably 0.1 mm to 3 mm, from the viewpoint of strength, reduction of color unevenness, suppression of deterioration of the first light absorbing body and the second light absorbing body, and the like. The width of the frame 38B is a width at the center point in the thickness direction of the cross section of the frame 38B. For example, in a case where the cross-sectional shape of the frame is a triangular shape as shown in FIG. 13, the width at the center point in the thickness direction is the width of the frame.

Further, the height (depth) of the frame 38B may be set according to the thickness of the light absorption region 35. As will be described later, the thickness of the light absorption region 35 is preferably 1 to 150 mm, so the height of the frame is preferably 1 to 150 μm.

Further, in the cross-sectional shape of the frame 38B, it is preferred that at least one of the corner portions is formed into a curved surface. For example, as in the example shown in FIG. 13, it is preferred that the vertex portion 38a and the foot portion 38b of the triangle are formed into curved surfaces. The radius of curvature of the curved surface may be set in accordance with the width and height of the frame 38B, and is preferably 5 μm to 200 μm.

Here, in the light absorbing material-containing film according to the embodiment of the present invention, it is preferable to have a region where the thickness of the light absorption region continuously changes at a position where the frame and the light absorption region are in contact with each other in a case of observing a cross section in the thickness direction of the light absorbing material-containing film.

Figure 14:
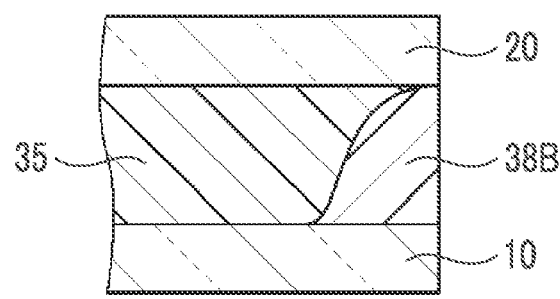
FIG. 14 is a cross-sectional view for explaining a shape of a contact position between the frame and the light absorption region.

FIG. 14 is a cross-sectional view of a contact position between the frame and the light absorption region in another example of the light absorbing material-containing film.

In the example shown in FIG. 14, the frame 38B has a triangular shape, and the surface of the frame 38B in contact with the light absorption region 35 (the interface between the frame 38B and the light absorption region 35) is inclined with respect to the main surface of the substrate films 10 and 20. The corner portion adjacent to the surface of the frame 38B that is in contact with the light absorption region 35 is formed into a curved surface. Therefore, as shown in FIG. 14, the thickness of the light absorption region 35 gradually decreases from the center side toward the end face side of the light absorbing material-containing film, at the position where the frame 38B and the light absorption region 35 are in contact with each other.

As described above, the frame contains the second light absorbing body different from the first light absorbing body in the light absorption region. That is, the second light absorbing body in the frame emits fluorescence having a wavelength (color) different from that of the first light absorbing body in the light absorption region. Therefore, in a case of not having a region where the thickness of the light absorption region continuously changes at a position where the frame and the light absorption region are in contact with each other, that is, in a case where the interface between the frame and the light absorption region is perpendicular to the main surfaces of the substrate films 10 and 20, the boundary between the light absorption region and the frame becomes easier to be visually recognized in a case of being viewed from the main surface of the light absorbing material-containing film.

On the other hand, by adopting a configuration having a region where the thickness of the light absorption region continuously changes at a position where the frame and the light absorption region are in contact with each other, the fluorescence from the first light absorbing body in the light absorption region and the fluorescence from the second light absorbing body in the frame are mixed and the ratio thereof continuously changes so that the boundary between the light absorption region and the frame becomes difficult to be visually recognized.

In FIG. 10, the outer shape of the frame 38B in a case of viewing the frame 38B from a direction perpendicular to the main surface of the light absorbing material-containing film (hereinafter, referred to as "plan view") is rectangular, but without being limited thereto, the size and shape of the outer shape of the frame may be set according to the size and shape required for the light absorbing material-containing film.

In FIG. 10, the light absorption region 35 has a rectangular shape in plan view, but without being limited thereto, the shape and the size of the light absorption region 35 may be set according to the size and shape required for the light absorbing material-containing film.

Here, although the target chromaticity can be reached in a case where the height (film thickness) of the light absorption region 35 is 1 μm or more, it is preferable to have a film thickness of a certain level or more since the influence of the film thickness unevenness becomes large. On the other hand, in a case where the film thickness of the light absorption region 35 is too large, the amount of light absorption increases and therefore the initial luminance may decrease. From these viewpoints, the height of the light absorption region 35 is 1 to 150 μm, preferably 5 to 120 μm, and more preferably 10 to 100 μm.

The height of the light absorption region and the height of the frame are determined in such a manner that the light absorbing material-containing film is cut with a microtome to form a cross section; the light absorbing material-containing layer is irradiated with excitation light to cause the light absorbing body to emit light; in this state, this cross section is observed with a confocal laser microscope; and ten places are extracted and the depth thereof is measured and the measured values are averaged.

In addition, the width of the frame 38B is determined in such a manner that the light absorbing material-containing layer is irradiated with excitation light to cause the light absorbing body in the light absorbing material-containing layer to emit light; in this state, the surface is observed from one surface of the light absorbing material-containing film using a confocal laser microscope; at least 20 places of the frame portion of the frame 38B are extracted and the width thereof is read; and the average value of these read values is calculated as the width.

In addition, the first light absorbing body 31 in the light absorption region 35 may be of one type or plural types. Similarly, the second light absorbing body 32 in the frame 38B may be of one type or plural types. Three or more types of light absorbing bodies may be used.

Further, as described above, the first substrate film 10 and the second substrate film 20 are preferably impermeable to oxygen and may have a laminated structure of a support film (11, 21) and a barrier layer (12, 22) having impermeability to oxygen as shown in FIG. 11.

In the example shown in FIG. 10, a configuration having one frame 38B is provided, but the present invention is not limited to thereto.

Figure 15:
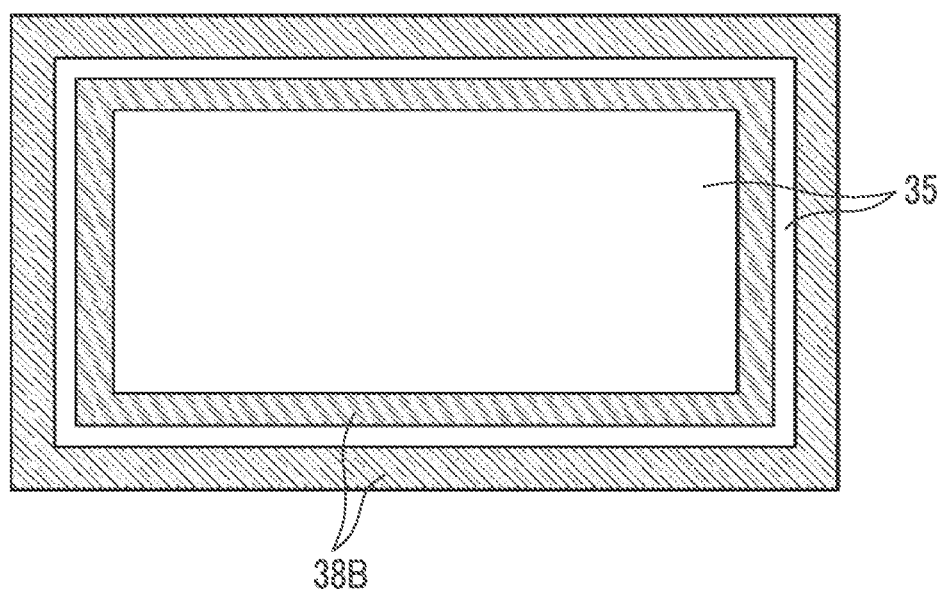
FIG. 15 is a plan view schematically showing another example of the light absorbing material-containing film of the present invention.
Figure 16:
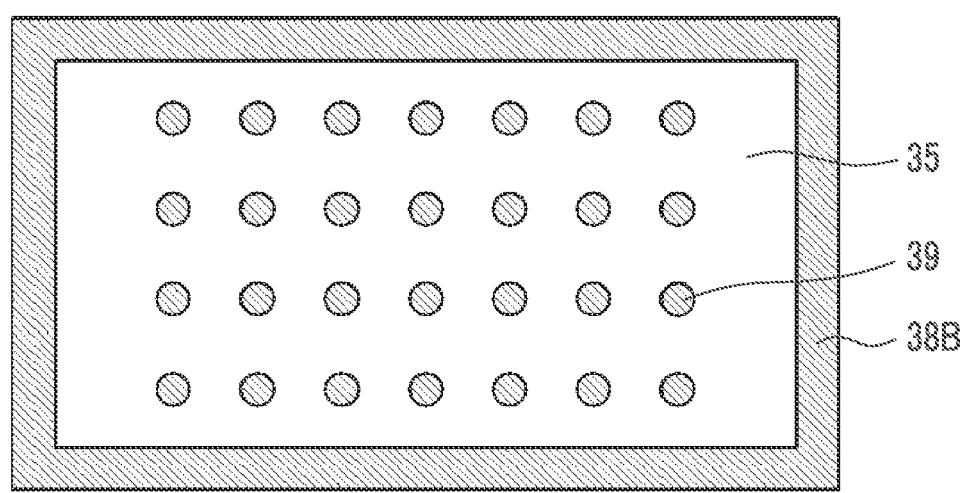
FIG. 16 is a plan view schematically showing another example of the light absorbing material-containing film of the present invention.

For example, as shown in FIG. 15, the frame 38B may have a plurality of picture frame shapes. Further, as shown in FIG. 16, a resin layer 39 of a cylinder or a polygonal prism may be provided in the central portion of the light absorbing material-containing film.

In the example shown in FIG. 15, multiple frames are provided so that two frames 38B having different sizes are provided, and a large frame 38B encloses a small frame 38B. A light absorption region 35 is filled between the large frame 38B and the small frame 38B. The deterioration of the light absorbing body at the end portion can be suppressed more favorably by providing multiple frames in this manner.

In the example shown in FIG. 15, a configuration having two frames 38B having different sizes is provided, but without being limited thereto, three or more frames having different sizes may be provided in multiple. Further, it is preferred that a light absorption region is provided between the frames.

Here, in a case where a plurality of frames 38B are provided in multiple, the types of the second light absorbing body 32 contained in each of the frames 38B may be the same or different. The contents of the second light absorbing body 32 contained in each of the frames 38B may be the same or different.

Here, it is preferred that at least one of the absorbance or the amount of luminescence of the second light absorbing body 32 contained in each of the frames 38B gradually decreases from the large frame 38B toward the small frame 38B. Thus, it is possible to suitably improve the leakage of blue light. In addition, the boundary between the light absorption region 35 and the frame 38B is difficult to be visually recognized.

Here, the absorbance and the amount of luminescence were measured as follows.

Each frame was cut so that the maximum width and the length of the frame were each 30 mm, and the cut frame was incorporated into the disassembled Kindle Fire HDX 7. The backlight unit was turned on and the light intensity (cd/m$^2$) was measured at a wavelength of 380 nm to 780 nm (every 1 nm wavelength) using a luminance meter (trade name "SR3", manufactured by Topcon Corporation) installed at a position 520 mm in the direction perpendicular to the surface of the light guide plate.

Absorbance was defined as the ratio of the intensity measured with incorporating a film to the intensity measured without incorporating a film at the wavelength of 450 nm.

The amount of luminescence was defined as an integrated value of the intensity measured by incorporating a film at a wavelength of 530 nm to 650 nm.

In the example shown in FIG. 16, a plurality of columnar resin layers 39 are provided in a central portion (a region inside the frame 38B) of the light absorbing material-containing film. In this manner, by taking a configuration in which the columnar resin layer 39 is appropriately disposed in the region inside the frame 38B, the in-plane tint can be more suitably adjusted and the point that the thickness of the light absorption region can be made uniform, which is thus preferable.

The material for forming the resin layer 39 may be the same material as the material for forming the frame 38B, and the resin layer 39 may contain the second light absorbing body.

In the example shown in FIG. 16, the resin layer 39 has a columnar shape, but the resin layer 39 may have a polygonal prism shape or may be amorphous. The bottom surface of the cylinder or polygonal prism may be disposed parallel to the surface of the substrate film, but the bottom surface may not necessarily be disposed parallel to the surface of the substrate film.

In order to produce a light absorbing material-containing film containing a light absorbing body such as a quantum dot with high production efficiency, preferred is a method in which a coating step and a curing step are sequentially carried out on a long film by a roll-to-roll method to form a laminated structure which is then cut into a desired size. The method of producing the light absorbing material-containing film will be described in detail later.

Individual constituent element of the light absorbing material-containing film according to the embodiment of the present invention will be described below.

The light absorbing material-containing film 1 has a configuration in which the first substrate film 10 is laminated on one surface of the light absorbing material-containing layer 30 and the second substrate film 20 is laminated on the other surface of the light absorbing material-containing layer 30.

In other words, the light absorbing material-containing film 1 has a configuration in which the light absorbing material-containing layer 30 is laminated on one film surface of the first substrate film 10 and the second substrate film 20 is laminated on the light absorbing material-containing layer 30 whereby the light absorbing material-containing layer 30 is sandwiched between the two substrate films 10 and 20.

—Light Absorbing Body-Containing Layer—

In the first aspect, the light absorbing material-containing layer 30 comprises a light absorption region 35 including a plurality of light absorbing bodies 31, and a resin layer 38A.

In the second aspect, the light absorbing material-containing layer 30 comprises a light absorption region 35 including a plurality of first light absorbing bodies 31 and a frame 38B (resin layer 38B) including a plurality of second light absorbing bodies 32.

The light absorption region 35 of the first aspect and the light absorption region 35 of the second aspect are basically the same. In addition, the light absorbing body 31 of the first aspect and the first light absorbing body 31 of the second aspect are basically the same. Therefore, in the following description, the light absorption region 35 and the light absorbing body 31 (the first light absorbing body 31) will be collectively described.

《Region Including Light Absorbing Body (Light Absorption Region)》

The light absorption region 35 includes a light absorbing body 31 and a binder 33 in which the light absorbing body 31 is dispersed. The light absorption region 35 is formed by coating and curing a coating liquid for forming a light absorption region containing a curable composition to be the light absorbing body 31 and the binder 33.

<Light Absorbing Body>

The light absorption region of the present invention contains at least one phosphor as a light absorbing body. Various known phosphors can be used as the phosphor. Examples of the phosphor include inorganic phosphors such as rare earth doped garnet, silicates, aluminates, phosphates, ceramic phosphors, sulfide phosphors, and nitride phosphors, and organic fluorescent substances including organic fluorescent dyes and organic fluorescent pigments. In addition, phosphors with rare earth-doped semiconductor fine particles, and semiconductor nanoparticles (quantum dots and quantum rods) are also suitably used. A single type of light absorbing body may be used alone, but a plurality of light absorbing bodies having different wavelengths may be mixed and used so as to obtain a desired spectrum, or a combination of phosphors of different material constitutions (for example, a combination of a rare earth doped garnet and quantum dots) may be used.

(Coloring Agent)

A coloring agent can also be used as the light absorbing body. Examples of the coloring agent include benzotriazole-, triazine-, pyrrole methine (PM)-, rhodamine (RH)-, and boron dipyrromethene (BODIPY)-based absorption dyes.

(Quantum dot)

The quantum dot is a fine particle of a compound semiconductor having a size of several nm to several tens of nm and is at least excited by incident excitation light to emit fluorescence.

The phosphor (light absorbing body) may include at least one quantum dot or may include two or more quantum dots having different luminescence properties. Known quantum dots include a quantum dot (A) having a luminescence center wavelength in a wavelength range in the range of 600 to 680 nm, a quantum dot (B) having a luminescence center wavelength in a wavelength range in the range of 500 nm or more to less than 600 nm, and a quantum dot (C) having a luminescence center wavelength in a wavelength range in the range of 400 nm or more to less than 500 nm, and the quantum dot (A) is excited by excitation light to emit red light, the quantum dot (B) is excited by excitation light to emit green light, and the quantum dot (C) is excited by excitation light to emit blue light. For example, in a case where blue light is incident as excitation light to a light absorbing material-containing layer containing the quantum dot (A) and the quantum dot (B), red light emitted from the quantum dot (A), green light emitted from the quantum dot (B) and blue light penetrating through the light absorbing material-containing layer can realize white light. Alternatively, ultraviolet light can be incident as excitation light to a light absorbing material-containing layer containing the quantum dots (A), (B), and (C), thereby allowing red light emitted from the quantum dot (A), green light emitted from the quantum dot (B), and blue light emitted from the quantum dot (C) to realize white light.

With respect to the quantum dot, reference can be made to, for example, paragraphs [0060] to [0066] of JP2012-169271A, but the quantum dot is not limited to those described therein. As the quantum dot, commercially available products can be used without any limitation. The luminescence wavelength of the quantum dot can usually be adjusted by the composition and size of the particles.

The quantum dot can be added in an amount of, for example, about 0.1 to 10 parts by mass with respect to 100 parts by mass of the total amount of the coating liquid.

In the first aspect, as described above, in a case where the concentration of the light absorbing body 31 in the light absorption region 35 is adjusted in the peripheral portion and the central portion, the concentration of quantum dots in this coating liquid may be changed in the peripheral portion and the central portion.

The quantum dots may be added into the coating liquid in the form of particles or in the form of a dispersion liquid in which the quantum dots are dispersed in an organic solvent. It is preferred that the quantum dots be added in the form of a dispersion liquid, from the viewpoint of suppressing aggregation of quantum dot particles. The organic solvent used for dispersing the quantum dots is not particularly limited.

As the quantum dots, for example, core-shell type semiconductor nanoparticles are preferable from the viewpoint of improving durability. As the core, Group II-VI semiconductor nanoparticles, Group III-V semiconductor nanoparticles, multi-component semiconductor nanoparticles, and the like can be used. Specific examples thereof include, but are not limited to, CdSe, CdTe, CdS, ZnS, ZnSe, ZnTe, InP, InAs, and InGaP. Among them, CdSe, CdTe, InP, InGaP are preferable from the viewpoint of emitting visible light with high efficiency. As the shell, CdS, ZnS, ZnO, GaAs, and complexes thereof can be used, but it is not limited thereto. The luminescence wavelength of the quantum dot can usually be adjusted by the composition and size of the particles.

The quantum dot may be a spherical particle or may be a rod-like particle also called a quantum rod, or may be a tetrapod-type particle. A spherical quantum dot or rod-like quantum dot (that is, a quantum rod) is preferable from the viewpoint of narrowing a full width at half maximum (FWHM) and enlarging the color reproduction range of a liquid crystal display.

A ligand having a Lewis basic coordinating group may be coordinated on the surface of the quantum dot. It is also possible to use quantum dots in which such a ligand is already coordinated. Examples of the Lewis basic coordinating group include an amino group, a carboxy group, a mercapto group, a phosphine group, and a phosphine oxide group. Specific examples thereof include hexylamine, decylamine, hexadecylamine, octadecylamine, oleylamine, myristylamine, laurylamine, oleic acid, mercaptopropionic acid, trioctylphosphine, and trioctylphosphine oxide. Among these, hexadecylamine, trioctylphosphine, and trioctylphosphine oxide are preferable, and trioctylphosphine oxide is particularly preferable.

Quantum dots in which these ligands are coordinated can be prepared by a known synthesis method. For example, such quantum dots can be synthesized by the method described in C. B. Murray, D. J. Norris, M. G. Bawendi, Journal American Chemical Society, 1993, 115(19), pp. 8706 to 8715, or The Journal Physical Chemistry, 101, pp. 9463 to 9475, 1997. In addition, commercially available quantum dots in which the ligands are coordinated can be used without any limitation. For example, Lumidot (manufactured by Sigma-Aldrich Co. LLC.) can be mentioned.

In the present invention, the content of the ligand-coordinated quantum dots is preferably 0.01% to 10% by mass and more preferably 0.05% to 5% by mass with respect to the total mass of the polymerizable compound contained in the quantum dot-containing composition to be the light absorption region. It is desirable to adjust the concentration, depending on the thickness of the light absorbing material-containing film.

The quantum dots may be added to the quantum dot-containing composition in the form of particles or in the form of a dispersion liquid dispersed in a solvent. It is preferable to add the quantum dots in the form of a dispersion liquid from the viewpoint of suppressing aggregation of particles of quantum dots. The solvent used here is not particularly limited.

(Method for Synthesizing Ligand)

The ligand in the quantum dot-containing composition can be synthesized by a known synthesis method. For example, the ligand can be synthesized by the method described in JP2007-277514A.

<Curable Composition for Forming Binder of Light Absorption Region>

In the present invention, the curable composition forming a binder of the light absorption region contains a polymer dispersant. Further, the curable composition preferably contains a polymerizable compound.

(Polymerizable Compound)

The polymerizable compound is preferably an acrylic compound. A monofunctional or polyfunctional (meth)acrylate monomer is preferable, and a prepolymer or polymer of a monomer may be used as long as it has polymerizability. In the present specification, the term "(meth)acrylate" refers to one or both of acrylate and methacrylate. The same applies to the term "(meth)acryloyl" or the like.

—Monofunctional Ones—

A monofunctional (meth)acrylate monomer may be, for example, acrylic acid or methacrylic acid, or derivatives thereof, more specifically, a monomer having one polymerizable unsaturated bond ((meth)acryloyl group) of (meth) acrylic acid in the molecule. Specific examples thereof include the following compounds, but the present embodiment is not limited thereto.

Examples thereof include alkyl (meth)acrylates having 1 to 30 carbon atoms in the alkyl group, such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; aralkyl (meth)acrylates having 7 to 20 carbon atoms in the aralkyl group, such as benzyl (meth)acrylate; alkoxyalkyl (meth)acrylates having 2 to 30 carbon atoms in the alkoxyalkyl group, such as butoxyethyl (meth)acrylate; aminoalkyl (meth)acrylates having 1 to 20 carbon atoms in total in the (monoalkyl or dialkyl)aminoalkyl group, such as N,N-dimethylaminoethyl (meth)acrylate; polyalkylene glycol alkyl ether (meth)acrylates having 1 to 10 carbon atoms in the alkylene chain and having 1 to 10 carbon atoms in the terminal alkyl ether, such as diethylene glycol ethyl ether (meth)acrylate, triethylene glycol butyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate, and tetraethylene glycol monoethyl ether (meth)acrylate; polyalkylene glycol aryl ether (meth)acrylates having 1 to 30 carbon atoms in the alkylene chain and having 6 to 20 carbon atoms in the terminal aryl ether, such as hexaethylene glycol phenyl ether (meth)acrylate; (meth)acrylates having an alicyclic structure and having 4 to 30 carbon atoms in total, such as cyclohexyl (meth)acrylate, dicyclopentanyl (meth)acrylate, isobornyl (meth)acrylate, and methylene oxide addition cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, triethylene glycol mono(meth)acrylate, tetraethylene glycol mono(meth)acrylate, hexaethylene glycol mono(meth)acrylate, octapropylene glycol mono(meth)acrylate, and glycerol mono or di(meth)acrylate; (meth)acrylates having a glycidyl group, such as glycidyl (meth)acrylate; polyethylene glycol mono(meth)acrylates having 1 to 30 carbon atoms in the alkylene chain, such as tetraethylene glycol mono(meth)acrylate, hexaethylene glycol mono(meth)acrylate, and octapropylene glycol mono(meth)acrylate; and (meth)acrylamides such as (meth)acrylamide, N,N-dimethyl (meth)acrylamide, N-isopropyl (meth)acrylamide, 2-hydroxyethyl (meth)acrylamide, and acryloylmorpholine.

The amount of the monofunctional (meth)acrylate monomer to be used is preferably 10 parts by mass or more and more preferably 10 to 80 parts by mass with respect to 100 parts by mass of the total amount of the curable compound contained in the coating liquid, from the viewpoint of adjusting the viscosity of the coating liquid to a preferable range.

—Difunctional Ones—

The polymerizable monomer having two polymerizable groups may be, for example, a difunctional polymerizable unsaturated monomer having two ethylenically unsaturated bond-containing groups. The difunctional polymerizable unsaturated monomer is suitable for allowing a composition to have a low viscosity. In the present embodiment, preferred is a (meth)acrylate-based compound which is excellent in reactivity and which has no problems associated with a remaining catalyst and the like.

In particular, neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, hydroxypivalate neopentyl glycol di(meth)acrylate, polyethylene glycol di(meth)acrylate, dicyclopentenyl(meth)acrylate, dicyclopentenyl oxyethyl (meth)acrylate, dicyclopentanyl di(meth)acrylate, or the like is suitably used in the present invention.

The amount of the difunctional (meth)acrylate monomer to be used is preferably 5 parts by mass or more and more preferably 10 to 80 parts by mass with respect to 100 parts by mass of the total amount of the curable compound contained in the coating liquid, from the viewpoint of adjusting the viscosity of the coating liquid to a preferable range.

—Tri- or Higher Functional Ones—

The polymerizable monomer having three or more polymerizable groups may be, for example, a polyfunctional polymerizable unsaturated monomer having three or more ethylenically unsaturated bond-containing groups. Such a polyfunctional polymerizable unsaturated monomer is excellent in terms of imparting mechanical strength. In the present embodiment, preferred is a (meth)acrylate-based compound which is excellent in reactivity and which has no problems associated with a remaining catalyst and the like.

Specifically, epichlorohydrin (ECH)-modified glycerol tri(meth)acrylate, ethylene oxide (EO)-modified glycerol tri(meth)acrylate, propylene oxide (PO)-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, pentaerythritol tetra(meth)acrylate, or the like is suitable.

Among them, EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, dipentaerythritol penta(meth)acrylate, pentaerythritolethoxy tetra(meth)

acrylate, or pentaerythritol tetra(meth)acrylate is particularly suitably used in the present invention.

The amount of the polyfunctional (meth)acrylate monomer to be used is preferably 5 parts by mass or more from the viewpoint of the coating film hardness of the phosphor-containing layer after curing, and preferably 95 parts by mass or less from the viewpoint of suppressing gelation of the coating liquid, with respect to 100 parts by mass of the total amount of the curable compound contained in the coating liquid.

From the viewpoint of further improving the heat resistance of the light absorption region (binder), the (meth)acrylate monomer is preferably an alicyclic acrylate. Examples of such a monofunctional (meth)acrylate monomer include dicyclopentenyl (meth)acrylate, dicyclopentanyl (meth)acrylate, and dicyclopentenyloxyethyl (meth)acrylate. Examples of the difunctional (meth)acrylate monomer include tricyclodecanedimethanol di(meth)acrylate.

The total amount of the polymerizable compound in the curable composition forming a binder is preferably 70 to 99 parts by mass and more preferably 85 to 97 parts by mass with respect to 100 parts by mass of the curable composition, from the viewpoint of handleability and curability of the composition.

—Epoxy-Based Compounds—

The polymerizable monomer may be, for example, a compound having a cyclic group such as a ring-opening polymerizable cyclic ether group such as an epoxy group or an oxetanyl group. Such a compound may be more preferably, for example, a compound having a compound (epoxy compound) having an epoxy group. Use of the compound having an epoxy group or an oxetanyl group in combination with the (meth)acrylate-based compound tends to improve adhesiveness to the barrier layer.

Examples of the compound having an epoxy group include polyglycidyl esters of polybasic acids, polyglycidyl ethers of polyhydric alcohols, polyglycidyl ethers of polyoxyalkylene glycols, polyglycidyl ethers of aromatic polyols, hydrogenated compounds of polyglycidyl ethers of aromatic polyols, urethane polyepoxy compounds, and epoxidized polybutadienes. These compounds may be used alone or in admixture of two or more thereof.

Examples of other compounds having an epoxy group, which may be preferably used, include aliphatic cyclic epoxy compounds, bisphenol A diglycidyl ethers, bisphenol F diglycidyl ethers, bisphenol S diglycidyl ethers, brominated bisphenol A diglycidyl ethers, brominated bisphenol F diglycidyl ethers, brominated bisphenol S diglycidyl ethers, hydrogenated bisphenol A diglycidyl ethers, hydrogenated bisphenol F diglycidyl ethers, hydrogenated bisphenol S diglycidyl ethers, 1,4-butanediol diglycidyl ethers, 1,6-hexanediol diglycidyl ethers, glycerin triglycidyl ethers, trimethylolpropane triglycidyl ethers, polyethylene glycol diglycidyl ethers, and polypropylene glycol diglycidyl ethers; polyglycidyl ethers of polyether polyols, obtained by adding one or two or more alkylene oxides to an aliphatic polyhydric alcohol such as ethylene glycol, propylene glycol, or glycerin; diglycidyl esters of aliphatic long chain dibasic acids; monoglycidyl ethers of aliphatic higher alcohols; monoglycidyl ethers of polyether alcohols, obtained by adding an alkylene oxide to phenol, cresol, butyl phenol, or these compounds; and glycidyl esters of higher fatty acids.

Among these components, aliphatic cyclic epoxy compounds, bisphenol A diglycidyl ethers, bisphenol F diglycidyl ethers, hydrogenated bisphenol A diglycidyl ethers, hydrogenated bisphenol F diglycidyl ethers, 1,4-butanediol diglycidyl ethers, 1,6-hexanediol diglycidyl ethers, glycerin triglycidyl ethers, trimethylolpropane triglycidyl ethers, neopentyl glycol diglycidyl ethers, polyethylene glycol diglycidyl ethers, and polypropylene glycol diglycidyl ethers are preferable.

Examples of commercially available products which can be suitably used as the compound having an epoxy group or an oxetanyl group include UVR-6216 (manufactured by Union Carbide Corporation), glycidol, AOEX24, CYCLOMER A200, CELLOXIDE 2021P and CELLOXIDE 8000 (all manufactured by Daicel Corporation), 4-vinylcyclohexene dioxide manufactured by Sigma-Aldrich Co. LLC., EPIKOTE 828, EPIKOTE 812, EPIKOTE 1031, EPIKOTE 872 and EPIKOTE CT508 (all manufactured by Yuka Shell Epoxy K.K.), and KRM-2400, KRM-2410, KRM-2408, KRM-2490, KRM-2720 and KRM-2750 (all manufactured by Asahi Denka Kogyo K.K.). These compounds may be used alone or in combination of two or more thereof.

Although there are no particular restrictions on the production method of such a compound having an epoxy group or an oxetanyl group, the compound can be synthesized with reference to, for example, Literatures such as Fourth Edition Experimental Chemistry Course 20 Organic Synthesis II, from p. 213, 1992, published by Maruzen KK; Ed. by Alfred Hasfner, The chemistry of heterocyclic compounds-Small Ring Heterocycles part 3 Oxiranes, John & Wiley and Sons, An Interscience Publication, New York, 1985, Yoshimura, Adhesion, vol. 29, No. 12, 32, 1985, Yoshimura, Adhesion, vol. 30, No. 5, 42, 1986, Yoshimura, Adhesion, vol. 30, No. 7, 42, 1986, JP1999-100378A (JP-H11-100378A), JP2906245B, and JP2926262B.

A vinyl ether compound may be used as the curable compound.

As the vinyl ether compound, a known vinyl ether compound can be appropriately selected, and, for example, the compound described in paragraph [0057] of JP2009-073078A may be preferably adopted.

Such a vinyl ether compound can be synthesized by, for example, the method described in Stephen. C. Lapin, Polymers Paint Colour Journal. 179 (4237), 321 (1988), namely, by a reaction of a polyhydric alcohol or a polyhydric phenol with acetylene, or a reaction of a polyhydric alcohol or a polyhydric phenol with a halogenated alkyl vinyl ether, and such method and reactions may be used alone or in combination of two or more thereof.

For the coating liquid, a silsesquioxane compound having a reactive group described in JP2009-073078A can also be used from the viewpoint of a decrease in viscosity and an increase in hardness.

<Polymerization Initiator>

The coating liquid may contain a known polymerization initiator as a polymerization initiator. With respect to the polymerization initiator, for example, reference can be made to paragraph [0037] of JP2013-043382A. The polymerization initiator is preferably in an amount of 0.1% by mol or more and more preferably 0.5% to 2% by mol based on the total amount of the curable compound contained in the coating liquid. In addition, the polymerization initiator is preferably contained in an amount of 0.1% to 10% by mass and more preferably 0.2% to 8% by mass, as the percentage by mass in the total curable composition excluding the volatile organic solvent.

—Photopolymerization Initiator—

The curable compound preferably contains a photopolymerization initiator. Any photopolymerization initiator may be used as long as it is a compound capable of generating an active species that polymerizes the polymerizable compound upon photo-irradiation. Examples of the photopolymerization initiator include a cationic polymerization initiator and a radical polymerization initiator, among which a radical polymerization initiator is preferable. Further, in the present invention, a plurality of photopolymerization initiators may be used in combination.

The content of the photopolymerization initiator is, for example, 0.01% to 15% by mass, preferably 0.1% to 12% by mass, and more preferably 0.2% to 7% by mass, in the total composition excluding the solvent. In a case where two or more photopolymerization initiators are used, the total amount thereof falls within the above range.

In a case where the content of the photopolymerization initiator is 0.01% by mass or more, sensitivity (fast curability) and coating film hardness tend to improve, which is preferable. On the other hand, in a case where the content of the photopolymerization initiator is 15% by mass or less, light transmittance, colorability, handleability, and the like tend to improve, which is preferable. In a system including a dye and/or a pigment, they may act as a radical trapping agent and affect photopolymerizability and sensitivity. In consideration of this point, in these applications, the addition amount of the photopolymerization initiator is optimized. On the other hand, in the composition used in the present invention, the dye and/or pigment is not an essential component, and the optimum range of the photopolymerization initiator may be different from that in the field of a curable composition for liquid crystal display color filter, or the like.

As the radical photopolymerization initiator, for example, a commercially available initiator can be used. The examples thereof include those described, for example, in paragraph [0091] of JP2008-105414A, which are preferably used. Among them, an acetophenone-based compound, an acylphosphine oxide-based compound, and an oxime ester-based compound are preferable from the viewpoint of curing sensitivity and absorption properties.

The acetophenone-based compound may be preferably, for example, a hydroxyacetophenone-based compound, a dialkoxyacetophenone-based compound, and an aminoacetophenone-based compound. The hydroxyacetophenone-based compound may be preferably, for example, IRGACURE (registered trademark) 2959 (1-[4-(2-hydroxyethoxy)phenyl]-2-hydroxy-2-methyl-1-propan-1-one), IRGACURE (registered trademark) 184 (1-hydroxycyclohexyl phenylketone), IRGACURE (registered trademark) 500 (1-hydroxycyclohexyl phenylketone, benzophenone), and Darocur (registered trademark) 1173 (2-hydroxy-2-methyl-1-phenyl-1-propan-1-one), all of which are commercially available from BASF Corporation. The dialkoxyacetophenone-based compound may be preferably, for example, IRGACURE (registered trademark) 651 (2,2-dimethoxy-1,2-diphenylethan-1-one) which is commercially available from BASF Corporation.

The aminoacetophenone-based compound may be preferably, for example, IRGACURE (registered trademark) 369 (2-benzyl-2-dimethylamino-1-(4-morpholinophenyl)butanone-1), IRGACURE (registered trademark) 379 (EG) (2-dimethylamino-2-(4-methylbenzyl)-1-(4-morpholin-4-yl phenyl)butan-1-one), and IRGACURE (registered trademark) 907 (2-methyl-1-[4-methylthiophenyl]-2-morpholinopropan-1-one), all of which are commercially available from BASF Corporation.

The acylphosphine oxide-based compound may be preferably, for example, IRGACURE (registered trademark) 819 (bis(2,4,6-trimethylbenzoyl)-phenylphosphine oxide), and IRGACURE (registered trademark) 1800 (bis(2,6-dimethoxybenzoyl)-2,4,4-trimethyl-pentylphosphine oxide), all of which are commercially available from BASF Corporation, and Lucirin TPO (2,4,6-trimethylbenzoyldiphenylphosphine oxide) and Lucirin TPO-L (2,4,6-trimethylbenzoylphenylethoxyphosphine oxide), both of which are commercially available from BASF Corporation.

The oxime ester-based compound may be preferably, for example, IRGACURE (registered trademark) OXE01 (1,2-octanedione, 1-[4-(phenylthio)phenyl]-2-(O-benzoyloxime)), or IRGACURE (registered trademark) OXE02 (ethanone, 1-[9-ethyl-6-(2-methylbenzoyl)-9H-carbazol-3-yl]-, 1-(O-acetyloxime)), all of which are commercially available from BASF Corporation.

The cationic photopolymerization initiator is preferably a sulfonium salt compound, an iodonium salt compound, an oxime sulfonate compound, or the like, and examples thereof include 4-methylphenyl-4-(1-methylethyl)phenyliodonium tetrakis(pentafluorophenyl)borate (PI 2074 manufactured by Rhodia, Inc.), 4-methylphenyl-4-(2-methylpropyl)phenyliodonium hexafluorophosphate (IRGACURE 250 manufactured by BASF Corporation), and IRGACURE PAG103, 108, 121, and 203 (all manufactured by BASF Corporation).

The photopolymerization initiator needs to be selected appropriately with respect to the wavelength of the light source to be used, but it is preferred that the photopolymerization initiator does not generate gas during mold pressurization/exposure. In a case where gas is generated, the mold is contaminated, so it is necessary to frequently clean the mold, or the photocurable composition is deformed in the mold, which contributes to problems such as deterioration of transfer pattern accuracy.

(Polymer)

The curable composition forming a binder may contain a polymer. Examples of the polymer include poly(meth)acrylate, poly(meth)acrylamide, polyester, polyurethane, polyurea, polyamide, polyether, and polystyrene.

(Other Additives)

The coating liquid for forming a light absorption region may contain a viscosity adjuster, a silane coupling agent, a surfactant, an antioxidant, an oxygen getter, a polymerization inhibitor, an inorganic particle, and the like.

—Viscosity Adjuster—

The coating liquid for forming a light absorption region may contain a viscosity adjuster, if necessary. Addition of a viscosity adjuster makes it possible to adjust to the desired viscosity. The viscosity adjuster is preferably a filler having a particle diameter of 5 nm to 300 nm. In addition, the viscosity adjuster may be a thixotropic agent. In the present invention and the present specification, the term "thixotropy" refers to a property of decreasing the viscosity with increasing shear rate in a liquid composition, and the term "thixotropic agent" refers to a material having a function of imparting thixotropy to a composition by incorporation thereof into a liquid composition. Specific examples of the thixotropic agent include fumed silica, alumina, silicon nitride, titanium dioxide, calcium carbonate, zinc oxide, talc, mica, feldspar, kaolinite (kaolin clay), pyrophyllite (pyrophyllite clay), sericite (silk mica), bentonite, smectite-vermiculites (montmorillonite, beidellite, nontronite, saponite, and the like), organic bentonite, and organic smectite.

<Silane Coupling Agent>

The light absorbing material-containing layer (light absorption region and resin layer (frame)) formed from the coating liquid containing a silane coupling agent can exhibit excellent durability due to having strong adhesiveness to an adjacent layer due to the silane coupling agent. In addition, the light absorbing material-containing layer formed from the coating liquid containing a silane coupling agent is also preferable in forming the relationship of "adhesion force A between support film and barrier layer<adhesion force B between light absorbing body-containing layer and barrier layer", under adhesion force conditions. This is mainly due to the fact that the silane coupling agent contained in the light absorbing material-containing layer forms a covalent bond with the surface of the adjacent layer or the constituent component of the light absorbing material-containing layer by hydrolysis reaction or condensation reaction. In a case where the silane coupling agent has a reactive functional group such as a radical polymerizable group, the formation of a crosslinking structure with a monomer component constituting the light absorbing material-containing layer can also contribute to an improvement in adhesiveness to the layer adjacent to the light absorbing material-containing layer.

For the silane coupling agent, a known silane coupling agent can be used without any limitation. From the viewpoint of adhesiveness, a preferred silane coupling agent may be, for example, a silane coupling agent represented by General Formula (1) described in JP2013-043382A.

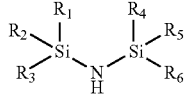

General Formula (1)

(In General Formula (1), $R_1$ to $R_6$ are each independently a substituted or unsubstituted alkyl group or aryl group, provided that at least one of $R_1, \ldots,$ or $R_6$ is a substituent containing a radical polymerizable carbon-carbon double bond.)

$R_1$ to $R_6$ are preferably an unsubstituted alkyl group or an unsubstituted aryl group, except for a case where $R_1$ to $R_6$ are a substituent containing a radical polymerizable carbon-carbon double bond. The alkyl group is preferably an alkyl group having 1 to 6 carbon atoms and more preferably a methyl group. The aryl group is preferably a phenyl group. $R_1$ to $R_6$ are each particularly preferably a methyl group.

It is preferred that at least one of $R_1, \ldots,$ or $R_6$ has a substituent containing a radical polymerizable carbon-carbon double bond, and two of $R_1$ to $R_6$ are a substituent containing a radical polymerizable carbon-carbon double bond. Further, it is particularly preferred that among $R_1$ to $R_3$, the number of those having a substituent containing a radical polymerizable carbon-carbon double bond is 1, and among $R_4$ to $R_6$, the number of those having a substituent containing a radical polymerizable carbon-carbon double bond is 1.

In a case where the silane coupling agent represented by General Formula (1) has two or more substituents containing a radical polymerizable carbon-carbon double bond, the respective substituents may be the same or different, and are preferably the same.

It is preferred that the substituent containing a radical polymerizable carbon-carbon double bond is represented by —X—Y, where X is a single bond, an alkylene group having 1 to 6 carbon atoms, or an arylene group, preferably a single bond, a methylene group, an ethylene group, a propylene group, or a phenylene group; and Y is a radical polymerizable carbon-carbon double bond group, preferably an acryloyloxy group, a methacryloyloxy group, an acryloylamino group, a methacryloylamino group, a vinyl group, a propenyl group, a vinyloxy group, or a vinylsulfonyl group, and more preferably a (meth)acryloyloxy group.

$R_1$ to $R_6$ may also have a substituent other than the substituent containing a radical polymerizable carbon-carbon double bond. Examples of such a substituent include alkyl groups (for example, a methyl group, an ethyl group, an isopropyl group, a tert-butyl group, a n-octyl group, an n-decyl group, an n-hexadecyl group, a cyclopropyl group, a cyclopentyl group, and a cyclohexyl group), aryl groups (for example, a phenyl group and a naphthyl group), halogen atoms (for example, fluorine, chlorine, bromine, and iodine), acyl groups (for example, an acetyl group, a benzoyl group, a formyl group, and a pivaloyl group), acyloxy groups (for example, an acetoxy group, an acryloyloxy group, and a methacryloyloxy group), alkoxycarbonyl groups (for example, a methoxycarbonyl group and an ethoxycarbonyl group), aryloxycarbonyl groups (for example, a phenyloxycarbonyl group), and sulfonyl groups (for example, a methanesulfonyl group and a benzenesulfonyl group).

The silane coupling agent is contained in the coating liquid in the range of preferably 1% to 30% by mass, more preferably 3% to 30% by mass, and still more preferably 5% to 25% by mass, from the viewpoint of further improving the adhesiveness to the adjacent layer.

—Surfactant—

The coating liquid for forming a light absorption region may contain at least one surfactant containing fluorine atoms in an amount of 20% by mass or more.

The surfactant preferably contains 25% by mass or more of fluorine atoms and more preferably 28% by mass or more of fluorine atoms. The upper limit value of the fluorine atom content is not specifically defined, but it is, for example, 80% by mass or less and preferably 70% by mass or less.

The surfactant used in the present invention is preferably a compound having an alkyl group having a fluorine atom, a cycloalkyl group having a fluorine atom, or an aryl group having a fluorine atom.

The alkyl group containing a fluorine atom is a linear or branched alkyl group in which at least one hydrogen atom is substituted with a fluorine atom. The alkyl group preferably has 1 to 10 carbon atoms and more preferably 1 to 4 carbon atoms. The alkyl group containing a fluorine atom may further have a substituent other than a fluorine atom.

The cycloalkyl group containing a fluorine atom is a monocyclic or polycyclic cycloalkyl group in which at least one hydrogen atom is substituted with a fluorine atom. The cycloalkyl group containing a fluorine atom may further have a substituent other than a fluorine atom.

The aryl group containing a fluorine atom is an aryl group in which at least one hydrogen atom is substituted with a fluorine atom. Examples of the aryl group include a phenyl group and a naphthyl group. The aryl group containing a fluorine atom may further have a substituent other than a fluorine atom.

By having such a structure, it is considered that the surface uneven distribution ability becomes satisfactory, and partial compatibility with the polymer occurs and phase separation is suppressed.

The molecular weight of the surfactant is preferably 300 to 10,000 and more preferably 500 to 5,000.

The content of the surfactant is, for example, 0.01% to 10% by mass, preferably 0.1% to 7% by mass, and more preferably 0.5% to 4% by mass in the total composition excluding the solvent. In a case where two or more surfactants are used, the total amount thereof falls within the above range.

Examples of the surfactant include FLUORAD FC-430 and FC-431 (trade names, manufactured by Sumitomo 3M Ltd.), SURFLON S-382 (trade name, manufactured by Asahi Glass Co., Ltd.), EFTOP "EF-122A, 122B, 122C, EF-121, EF-126, EF-127, and MF-100" (manufactured by Tohkem Products Corporation), PF-636, PF-6320, PF-656 and PF-6520 (trade names, all manufactured by OMNOVA Solutions, Inc.), FTERGENT FT250, FT251 and DFX18 (trade names, all manufactured by NEOS Co., Ltd.), UNIDYNE DS-401, DS-403 and DS-451 (trade names, all manufactured by Daikin Industries Ltd.), MEGAFACE 171, 172, 173, 178K and 178A (trade names, all manufactured by DIC Corporation), X-70-090, X-70-091, X-70-092 and X-70-093 (trade names, all manufactured by Shin-Etsu Chemical Co., Ltd.), and MEGAFACE R-08 and XRB-4 (trade names, all manufactured by DIC Corporation).

(Other Components)

In addition to the above-mentioned components, the curable compound may contain other components such as an antioxidant as long as the effects of the present invention are not impaired, depending on various purposes.

—Antioxidant—

The curable compound preferably contains a known antioxidant. The antioxidant is for suppressing color fading by heat or photo-irradiation, and for suppressing color fading by various oxidizing gases such as ozone, active oxygen NOx and SOx (X is an integer). Especially in the present invention, addition of the antioxidant brings about advantages that the cured film is prevented from being colored and the film thickness is prevented from being reduced through decomposition.

Further, two or more antioxidants may be used as the antioxidant.

The content of the antioxidant in the curable compound is preferably 0.2% by mass or more, more preferably 1% by mass or more, and still more preferably 2% by mass or more with respect to the total mass of the curable compound. On the other hand, the antioxidant may be altered due to the interaction with oxygen. The altered antioxidant may induce decomposition of the quantum dot-containing polymerizable composition, resulting in lowering of adhesiveness, brittleness deterioration, and lowering of quantum dot luminous efficiency. From the viewpoint of preventing these deteriorations, the content of the antioxidant is preferably 20% by mass or less, more preferably 15% by mass or less, and still more preferably 10% by mass or less with respect to the total mass of the curable compound.

The antioxidant is preferably at least one of a radical inhibitor, a metal deactivator, a singlet oxygen scavenger, a superoxide scavenger, or a hydroxy radical scavenger. Examples of the antioxidant include a phenol-based antioxidant, a hindered amine-based antioxidant, a quinone-based antioxidant, a phosphorus-based antioxidant, and a thiol-based antioxidant.

Examples of the phenol-based antioxidant include 2,6-di-tert-butyl-p-cresol, 2,6-diphenyl-4-octadecyloxyphenol, distearyl (3,5-di-tert-butyl-4-hydroxybenzyl)phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyebutane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[3-(3,5-di-tert-butyl-4-hydroxyphenyl)propionic acid methyl]methane ((ADEKASTAB AO-60, manufactured by ADEKA Corporation)), thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyebutyl acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol bis[(3-tert-butyl-4-hydroxy-5-methylphenyl)propionate].

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphites of 2-ethyl-2-butylpropylene glycol and 2,4,6-tri-tert-butylphenol. The amount of these phosphorus-based antioxidants added is preferably 0.001 to 10 parts by mass and more preferably 0.05 to 5 parts by mass with respect to 100 parts by mass of the polyolefin-based resin.

Examples of the thiol-based antioxidant include dialkyl thiodipropionates such as dilauryl thiodipropionate, dimyristyl thiodipropionate, and distearyl thiodipropionate; and pentaerythritol tetra(β-alkyl mercaptopropionic acid) esters.

The hindered amine-based antioxidant is also referred to as a hindered amine light stabilizer (HALS), and has a structure in which all hydrogen atoms on carbons at 2- and 6-positions of piperidine are substituted with methyl groups, preferably a group represented by Formula 1. In Formula 1, X represents a hydrogen atom or an alkyl group. Among the groups represented by Formula 1, HALS having a 2,2,6,6-tetramethyl-4-piperidyl group in which X is a hydrogen atom, or a 1,2,2,6,6-pentamethyl-4-piperidyl group in which X is a methyl group is particularly preferably adopted. A number of HALS having a structure in which a group represented by Formula 1 is bonded to a —COO— group, that is, a group represented by Formula 2 are commercially available, but these can be preferably used.

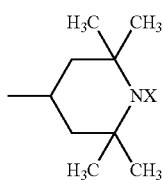

(Formula 1)

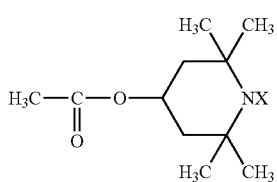

(Formula 2)

Specific examples of HALS that can be preferably used in the present invention include those represented by the following formulae. Here, the 2,2,6,6-tetramethyl-4-piperidyl group is represented by R and the 1,2,2,6,6-pentamethyl-4-piperidyl group is represented by R'.

ROC(=O)(CH$_2$)$_8$C(=O)OR, ROC(=O)C(CH$_3$)=CH$_2$, R'OC(=O)C(CH$_3$)=CH$_2$, CH$_2$(COOR)CH(COOR)CH(COOR)CH$_2$COOR, CH$_2$(COOR')CH(COOR')CH(COOR')CH$_2$COOR', a compound represented by Formula 3, and the like.

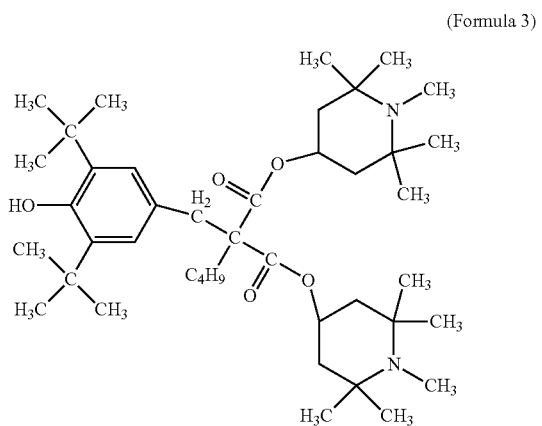

(Formula 3)

Specific examples of HALS include hindered amine compounds such as 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)-di(tridecyl)-1,2,3,4-butane tetracarboxylate, bis(1,2,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyea-mino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, and 1,6,11-tris[2,4-bis(N-butyl-N-(1,2,2,6,6-pentamethyl-4-piperidyeamino)-s-triazin-6-yl]aminoundecane.

Specific products of HALS include, but are not limited to, TINUVIN 123, TINUVIN 144, TINUVIN 765, TINUVIN 770, TINUVIN 622, CHIMASSORB 944, and CHIMASSORB 119 (all of which are trade names of Ciba Specialty Chemicals Inc.), ADEKASTAB LA52, ADEKASTAB LA57, ADEKASTAB LA62, ADEKASTAB LA67, ADEKASTAB LA82, ADEKASTAB LA87, and ADEKASTAB LX335 (all of which are trade names of Asahi Denka Kogyo KK).

Among the HALS, those having a relatively small molecular weight are preferable because of easy diffusion from the resin layer to the light absorption region. Preferred HALS in this viewpoint are compounds represented by ROC(=O)(CH$_2$)$_8$C(=O)OR, R'OC(=O)C(CH$_3$)=CH$_2$, and the like.

Among the above-mentioned antioxidants, at least one of a hindered phenol compound, a hindered amine compound, a quinone compound, a hydroquinone compound, a tocopherol compound, an aspartic acid compound, or a thiol compound is more preferable, and at least one of a citric acid compound, an ascorbic acid compound, or a tocopherol compound is still more preferable. Although these compounds are not particularly limited, preferred examples thereof include hindered phenol, hindered amine, quinone, hydroquinone, tocopherol, aspartic acid, thiol, citric acid, tocopheryl acetate, and tocopheryl phosphate per se, and salts or ester compounds thereof.

An example of the antioxidant is shown below.

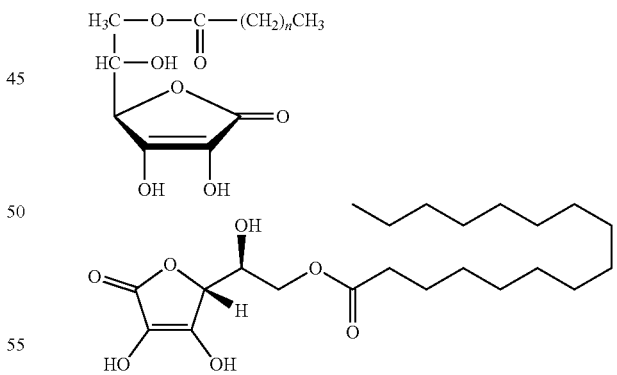

Ascorbic acid palmitic acid ester (ascorbyl palmitate)

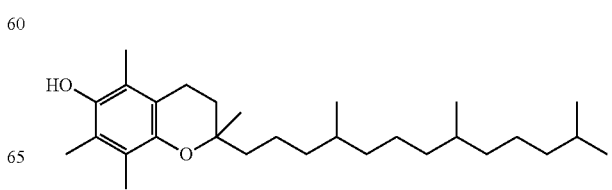

-continued

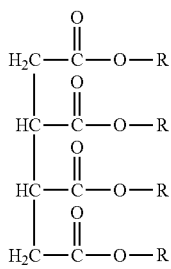 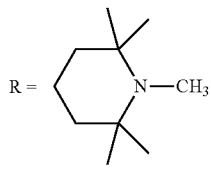

Tetrakis(1,2,2,6,6-pentamethyl-4-piperidyl)butane-1,2,3,4-tetracarboxylate (trade name: ADEKASTAB LA-52, manufactured by ADEKA Corporation)

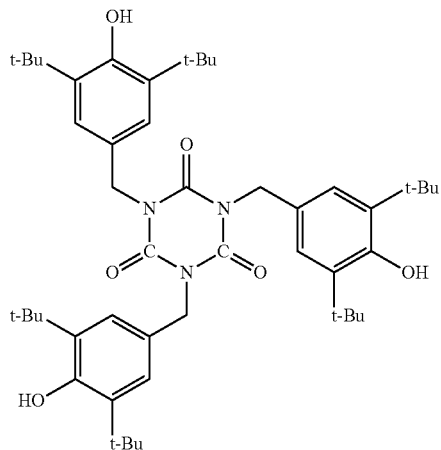 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

1,3,5-tris(3,5-di-tert-butyl-4-hydroxybenzyl)-1,3,5-triazine-2,4,6(1H, 3H, 5H)-trione (trade name: ADEKASTAB AO-20, manufactured by ADEKA Corporation)

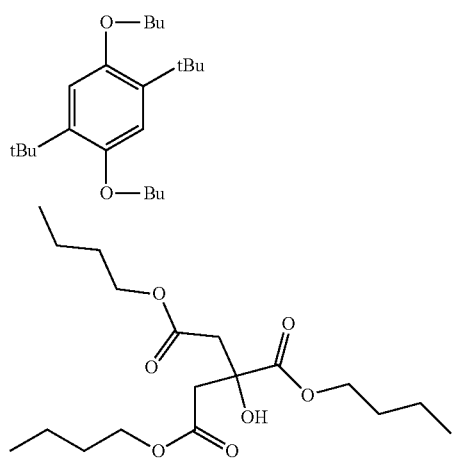

B-3

Tributyl Citrate

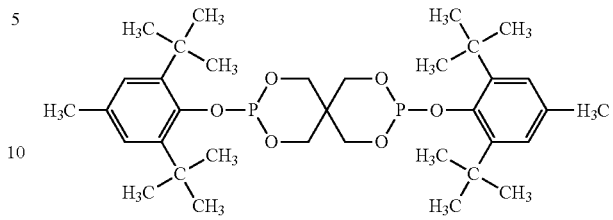

3,9-Bis(2,6-di-tert-butyl-4-methylphenoxy)-2,4,8,10-tetraoxa-3,9-diphosphaspiro[5,5]undecane (trade name: ADEKASTAB PEP-36, manufactured by ADEKA Corporation)

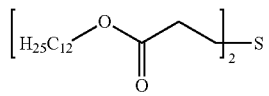

Dilauryl thiodipropionate (IRGANOX PS 800, 800FD, manufactured by BASF Corporation)

—Oxygen Getter—

A known substance used as a getter of an organic EL device can be used as the oxygen getter. The oxygen getter may be either an inorganic getter or an organic getter, and is preferable to include at least one compound selected from a metal oxide, a metal halide, a metal sulfate, a metal perchlorate, a metal carbonate, a metal alkoxide, a metal carboxylate, a metal chelate, or a zeolite (aluminosilicate).

Examples of such an oxygen getter include calcium oxide (CaO), barium oxide (BaO), magnesium oxide (MgO), strontium oxide (SrO), lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$), and nickel sulfate ($NiSO_4$).

The organic getter is not particularly limited as long as it is a material that takes in water by a chemical reaction and does not become opaque before and after the reaction. Here, the organometallic compound means a compound having a metal-carbon bond, a metal-oxygen bond, a metal-nitrogen bond or the like. In a case where water reacts with the organometallic compound, the above-mentioned bond of the compound breaks due to a hydrolysis reaction to result in a metal hydroxide. Depending on the metal, hydrolytic polycondensation may be carried out to increase the molecular weight after the reaction into the metal hydroxide.

As the metal of the metal alkoxide, the metal carboxylate, and the metal chelate, it is preferable to use a metal having good reactivity with water as the organometallic compound, that is, a metal atom which is easily breakable from a variety of bonds by the action of water. Specific examples thereof include aluminum, silicon, titanium, zirconium, bismuth, strontium, calcium, copper, sodium, and lithium. In addition, cesium, magnesium, barium, vanadium, niobium, chromium, tantalum, tungsten, chromium, indium, iron, and the like can be mentioned. In particular, a desiccating agent of an organometallic compound having aluminum as a central metal is preferable in terms of dispersibility in a resin and reactivity with water. Examples of the organic group include an unsaturated hydrocarbon such as a methoxy group, an ethoxy group, a propoxy group, a butoxy group, a 2-ethylhexyl group, an octyl group, a decyl group, a hexyl group, an octadecyl group, a stearyl group, a saturated hydrocarbon, a branched unsaturated hydrocarbon, a branched saturated hydrocarbon, an alkoxy group or carboxyl group containing a cyclic hydrocarbon, and a β-diketonato group such as an acetylacetonato group or a dipivaloylmethanato group.

Among them, aluminum ethyl acetoacetates having 1 to 8 carbon atoms shown in the following chemical formulae are suitably used from the viewpoint that a sealing composition having excellent transparency can be formed.

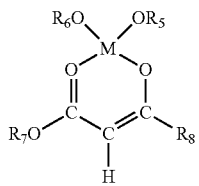

(In the formula, $R_5$ to $R_8$ each represent an organic group including an alkyl group, an aryl group, an alkoxy group, a cycloalkyl group or an acyl group, each of which has 1 to 8 carbon atoms, and M represents a trivalent metal atom. In addition, $R_5$ to $R_8$ may be the same organic group or different organic groups.)

The above-mentioned aluminum ethyl acetoacetates having 1 to 8 carbon atoms are commercially available, for example, from Kawaken Fine Chemical Co., Ltd. or Hope Pharmaceutical Co., Ltd.

The oxygen getter is in particulate or powder form. The average particle diameter of the oxygen getter may be usually in the range of less than 20 μm, preferably 10 μm or less, more preferably 2 μm or less, and still more preferably 1 μm or less. From the viewpoint of scattering property, the average particle diameter of the oxygen getter is preferably 0.3 to 2 μm and more preferably 0.5 to 1.0 μm. The term "average particle diameter" as used herein refers to an average value of particle diameters calculated from a particle size distribution measured by a dynamic light scattering method.

—Polymerization Inhibitor—

The curable composition forming a binder may contain a polymerization inhibitor. The content of the polymerization inhibitor is 0.001% to 1% by mass, more preferably 0.005% to 0.5% by mass, and still more preferably 0.008% to 0.05% by mass, with respect to all the polymerizable monomers. Changes in viscosity over time can be suppressed while maintaining a high curing sensitivity by blending the polymerization inhibitor in an appropriate amount. On the other hand, in a case where the amount of the polymerization inhibitor to be added is excessive, a curing failure due to inhibition of polymerization and coloration of the cured product occur, so an appropriate amount of the polymerization is present. The polymerization inhibitor may be added at the time of production of the polymerizable monomer or may be added later to the curable composition. Preferred examples of the polymerization inhibitor include hydroquinone, p-methoxyphenol, di-tert-butyl-p-cresol, pyrrogallol, tert-butylcatechol, benzoquinone, 4,4'-thiobis(3-methyl-6-tert-butylphenol), 2,2'-methylenebis(4-methyl-6-tert-butylphenol), cerous N-nitrosophenylhydroxyamine, phenothiazine, phenoxazine, 4-methoxynaphthol, 2,2,6,6-tetramethylpiperidine-1-oxyl free radical, 2,2,6,6-tetramethylpiperidine, 4-hydroxy-2,2,6,6-tetramethylpiperidine-1-oxyl free radical, nitrobenzene, and dimethylaniline, among which preferred is p-benzoquinone, 2,2,6,6-tetramethylpiperidine-1-oxyl free radical, 4-hydroxy-2,2,6,6-tetramethylpiperidine-1-oxyl free radical, or phenothiazine. These polymerization inhibitors suppress generation of polymer impurities not only during the production of the polymerizable monomers but also during storage of the curable composition and suppress degradation of pattern formability during imprinting.

—Inorganic Particles—

Further, the coating liquid for forming a light absorption region preferably contains inorganic particles. Incorporation of inorganic particles can provide an enhanced impermeability to oxygen. Examples of inorganic particles include inorganic layered compounds such as silica particles, alumina particles, zirconium oxide particles, zinc oxide particles, titanium oxide particles, mica, and talc. The inorganic particles are preferably plate-like from the viewpoint of enhancing the impermeability to oxygen, and the aspect ratio (r=a/b, where a>b) of the inorganic particles is preferably 2 to 1000, more preferably 10 to 800, and still more preferably 20 to 500. A larger aspect ratio is preferable because it has an excellent effect of enhancing the impermeability to oxygen. However, in a case where the aspect ratio is too large, physical strength of a film or particle dispersibility in a curing composition is poor.

—Light Scattering Particles—

In one aspect, the light absorbing material-containing layer (light absorption region and resin layer (frame)) may contain light scattering particles. Therefore, light scattering particles may be added to the photocurable composition.

The particle size of the light scattering particles is preferably 0.10 μm or more. Incorporation of the light scattering particles in the light absorbing material-containing layer is preferable from the viewpoint of further improving the luminance From the viewpoint of the light scattering effect, the particle size of the light scattering particles is preferably in the range of 0.10 to 15.0 μm, more preferably in the range of 0.10 to 10.0 μm, and still more preferably in the range of 0.20 to 4.0 μm. Two or more kinds of light scattering particles having different particle sizes may be mixed and used in order to further improve the luminance and adjust the distribution of the luminance with respect to the viewing angle.

The light scattering particles may be organic particles, inorganic particles, or organic-inorganic composite particles. For example, synthetic resin particles can be mentioned as organic particles. Specific examples of synthetic resin particles include silicone resin particles, acrylic resin particles (polymethyl methacrylate (PMMA)), nylon resin particles, styrene resin particles, polyethylene particles, urethane resin particles, and benzoguanamine particles. From the viewpoint of the light scattering effect, it is preferred that the refractive indices of the light scattering particles and the other portion are different in the light absorbing material-containing layer, and from this point of view, the silicone resin particles and acrylic resin particles are preferable from the viewpoint of easy availability of particles having a suitable refractive index. Particles having a hollow structure can also be used. As the inorganic particles, particles of diamond, titanium oxide, zirconium oxide, lead oxide, lead carbonate, zinc oxide, zinc sulfide, antimony oxide, silicon oxide, aluminum oxide or the like can be used. Titanium oxide and aluminum oxide are preferable from the viewpoint of easy availability of particles having a suitable refractive index.

In addition to the above-mentioned components, a releasing agent, a silane coupling agent, an ultraviolet absorber, a light stabilizer, an anti-aging agent, a plasticizer, an adhesion promoter, a thermal polymerization initiator, a colorant, elastomer particles, a photoacid proliferating agent, a photobase generator, a basic compound, a flow adjusting agent, an anti-foaming agent, a dispersant, or the like may be optionally added to the coating liquid for forming a light absorption region.

The method for preparing the curable composition forming a binder is not particularly limited, and it may be carried out by a procedure for preparing a common curable composition.

《Resin Layer》

The resin layer 38A is formed by applying and curing a coating liquid for forming a resin containing the same curable composition as the above-mentioned curable composition forming a binder.

The resin layer 38A preferably has a modulus of elasticity of 0.5 to 10 GPa, more preferably 1 to 7 GPa, and still more preferably 3 to 6 GPa. In a case where the modulus of elasticity of the resin layer is set to fall within this range, it is possible to prevent defects in a case of forming the resin layer, which is preferable.

The modulus of elasticity of the resin layer is measured by a method exemplified in JIS K7161 or the like.

The resin layer 38A preferably satisfies an oxygen permeability of 500 cc/(m²·day·atm) or less at the shortest distance between the adjacent fluorescent regions 35 with the resin layer 38A being therebetween. The oxygen permeability at the shortest distance between the adjacent fluorescent regions 35 of the resin layer 38A is more preferably 50 cc/(m²·day·atm) or less and still more preferably 5 cc/(m²·day·atm) or less.

With respect to oxygen permeability, fm/(s·Pa) can be used as the SI unit. It is possible to carry out conversion of units as a relationship of 1 fm/(s·Pa)=8.752 cc/(m²·day·atm). fm is read as femtometer and 1 fm=$10^{-15}$ m.

By using a resin layer having a low oxygen permeability, penetration of oxygen from the end portion of the light absorbing material-containing film can be reduced and therefore deterioration of the light absorbing body can be suppressed. As a result, display unevenness not only in the initial stage but also after aging can be suppressed.

The material for forming the resin layer 38A is preferably a compound having a di- or higher functional photopolymerizable crosslinking group, and examples thereof include alicyclic (meth)acrylate such as urethane (meth)acrylate or tricyclodecanedimethanol di(meth)acrylate; (meth)acrylate having a hydroxyl group such as pentaerythritol triacrylate; aromatic (meth)acrylate such as modified bisphenol A di(meth)acrylate; dipentaerythritol di(meth)acrylate, 3,4-epoxycyclohexylmethyl (meth)acrylate, 3',4'-epoxycyclohexylmethyl 3,4-epoxycyclohexane carboxylate, and bisphenol A type epoxy. Above all, it is preferable to include at least urethane (meth)acrylate and an epoxy compound from the viewpoint of enhancing the impermeability to oxygen. By using a compound having a urethane bond or a polar functional group such as a hydroxyl group or a carboxyl group to enhance intermolecular interaction, a resin layer having high impermeability to oxygen can be obtained. It is preferable to include a compound having the same polymerizable crosslinking group as that of the light absorption region from the viewpoint of excellent adhesion between the resin layer and the light absorption region. For example, in a case where dicyclopentanyl (meth)acrylate or the like is contained in the material of the light absorption region, the resin layer suitably contains at least a (meth)acrylate compound.

(Additives)

If necessary, the resin forming material may contain a photopolymerization initiator, an inorganic layered compound, light scattering particles, an antioxidant, a release promoter, a solvent, a phosphor different from the light absorbing body used for the light absorbing material-containing layer, or the like. Various known phosphors can be used as the phosphor. Examples of the phosphor include inorganic phosphors such as rare earth doped garnet, silicates, aluminates, phosphates, ceramic phosphors, sulfide phosphors, and nitride phosphors, and organic fluorescent substances including organic fluorescent dyes and organic fluorescent pigments. In addition, phosphors with rare earth-doped semiconductor fine particles, and semiconductor nanoparticles (quantum dots and quantum rods) are also suitably used. A single type of light absorbing body may be used alone, but a plurality of light absorbing bodies having different wavelengths may be mixed and used so as to obtain a desired spectrum, or a combination of phosphors of different material constitutions (for example, a combination of a rare earth doped garnet and quantum dots) may be used.

(Photopolymerization Initiator)

The curable compound forming the resin layer 38A preferably contains a photopolymerization initiator. Any photopolymerization initiator may be used as long as it is a compound capable of generating an active species that polymerizes the polymerizable compound upon photo-irradiation. Examples of the photopolymerization initiator include a cationic polymerization initiator and a radical polymerization initiator, which are appropriately selected according to the resin layer forming material.

(Inorganic Layered Compound)

The curable compound forming the resin layer 38A may contain a compound that imparts a so-called maze effect, such as an inorganic layered compound, which extends the diffusion length of gas molecules in the resin layer to improve gas barrier properties. Examples of such an inorganic layered compound include talc, mica, feldspar, kaolinite (kaolin clay), pyrophyllite (pyrophyllite clay), sericite (silk mica), bentonite, smectite-vermiculites (montmorillonite, beidellite, non-tronite, saponite, and the like), organic bentonite, organic smectite, and flat inorganic oxide such as flat alumina. The inorganic layered compound may be subjected to a surface treatment in order to improve dispersibility in the resin forming material. Further, from the viewpoint of the excellent maze effect described above, the inorganic layered compound preferably has an aspect ratio of 10 to 1000. In a case where the aspect ratio is 10 or less, the effect of improving the gas barrier property due to the maze effect is low, and in a case where the aspect ratio is 1000 or more, the inorganic layered compound is brittle and therefore may be crushed during the preparation process.

These layered compounds can be used alone or in combination of two or more thereof. Examples of commercially available layered compounds as the inorganic compound include ST-501 and ST-509 (manufactured by Shiraishi Calcium Kaisha, Ltd.), SOMASIF series and Micro Mica series (manufactured by Katakura & Co-op Agri Corporation), and SERAPH series (manufactured by Kinsei Matec Co., Ltd.). In particular, in the light absorbing material-containing film according to the embodiment of the present invention, a SERAPH series having high transparency can be suitably used.

«Frame»

The frame 38B includes a second light absorbing body 32 and a binder 34 in which the second light absorbing body 32 is dispersed. The frame 38B is formed by applying and curing a curable composition similar to the curable composition forming the above-described binder 33 and serving as the binder 34, and a coating liquid for forming a frame including the second light absorbing body.

As described above, since the frame 38B contains the second light absorbing body 32, it is possible to improve the leakage of blue light from the end portion of the film and to suppress occurrence of color unevenness.

The frame 38B preferably has a modulus of elasticity of 0.5 to 10 GPa, more preferably 1 to 7 GPa, and still more preferably 3 to 6 GPa. In a case where the modulus of elasticity of the frame is set to fall within this range, it is possible to prevent defects in a case of forming the frame, which is preferable.

The modulus of elasticity of the frame is measured by a method exemplified in JIS K7161 or the like.

As described above, the frame 38B has an oxygen permeability of 20 cc/(m$^2$·day·atm) or less at the shortest distance between the outside and the light absorption region 35. The oxygen permeability of the frame 38B is more preferably 15 cc/(m$^2$·day·atm) or less and still more preferably 10 cc/(m$^2$·day·atm) or less.

By using a frame having a low oxygen permeability, penetration of oxygen from the end portion of the light absorbing material-containing film can be reduced and therefore deterioration of the light absorbing body can be suppressed. As a result, display unevenness not only in the initial stage but also after aging can be suppressed. At that time, not only deterioration of the first light absorbing body 31 included in the light absorption region 35 can be suppressed, but also deterioration of the second light absorbing body 32 included in the frame 38B can be suppressed. Therefore, even after a lapse of time, it is possible to improve the leakage of blue light and therefore the occurrence of color unevenness can be suppressed.

<Second Light Absorbing Body>

The frame contains at least one light absorbing body (phosphor) different from the first light absorbing body as the second light absorbing body.

Various known phosphors can be used as the second light absorbing body (phosphor). Examples of the phosphor include inorganic phosphors such as rare earth doped garnet, silicates, aluminates, phosphates, ceramic phosphors, sulfide phosphors, and nitride phosphors, and organic fluorescent substances including organic fluorescent dyes and organic fluorescent pigments. In addition, phosphors with rare earth-doped semiconductor fine particles, and semiconductor nanoparticles (quantum dots and quantum rods) are also suitably used. A single type of second light absorbing body may be used alone, but a plurality of light absorbing bodies having different wavelengths may be mixed and used so as to obtain a desired spectrum, or a combination of phosphors of different material constitutions (for example, a combination of a rare earth doped garnet and quantum dots) may be used.

Specifically, for example, in a case where blue light or ultraviolet light is used as the excitation light, a phosphor that emits yellow fluorescence that is complementary to leakage of blue light is used. For example, yttrium aluminum garnet phosphor (YAG), SiAlON, or the like is used as the phosphor emitting yellow fluorescence.

For example, about 0.1 to 30 parts by mass of the second light absorbing body can be added with respect to 100 parts by mass of the total amount of the coating liquid for forming a frame.

In addition, the second light absorbing body may be added in the form of particles to the coating liquid for forming a frame, or may be added in the form of a dispersion liquid dispersed in a solvent. It is preferable to add the second light absorbing body in the form of a dispersion liquid from the viewpoint of suppressing aggregation of particles of the second light absorbing body. The solvent used here is not particularly limited.

<Curable Composition for Forming Binder of Frame>

The above-mentioned curable composition for forming the resin layer 38A can be used as the curable composition for forming the binder 34 of the frame 38B. That is, the same curable composition as the above-mentioned curable composition for forming the binder 33 of the light absorption region 35 can be used as the curable composition for forming the binder 34.

A compound having a di- or higher functional photopolymerizable crosslinking group is preferable as the binder of the frame 38B, and examples thereof include alicyclic (meth)acrylates such as urethane (meth)acrylate and tricyclodecanedimethanol di(meth)acrylate; (meth)acrylate having a hydroxyl group such as pentaerythritol triacrylate; aromatic (meth)acrylate such as modified bisphenol A di(meth)acrylate; dipentaerythritol di(meth)acrylate, 3,4-epoxycyclohexylmethyl(meth)acrylate, 3',4'-epoxycyclohexylmethyl-3,4-epoxycyclohexane carboxylate, and bisphenol A type epoxy. Above all, from the viewpoint of enhancing the impermeability to oxygen, it is preferable to include at least urethane (meth)acrylate and an epoxy compound. By using a compound having a urethane bond or a polar functional group such as a hydroxyl group or a carboxyl group, the interaction between molecules is enhanced and therefore a frame having high impermeability to oxygen can be obtained. In addition, it is preferable to include a compound having the same polymerizable crosslinking group as the light absorption region from the viewpoint of excellent intimate attachment between the frame and the light absorption region. For example, in a case where dicyclopentanyl (meth)acrylate or the like is contained in the material of the light absorption region, it is suitable that the frame at least includes a (meth)acrylate compound.

(Additives)

The material for forming a frame (the coating liquid for forming a frame) may optionally contain a photopolymerization initiator, an inorganic layered compound, light scattering particles, an antioxidant, a release promoter, a solvent, and the like.

—Substrate Film—

The first substrate film 10 and the second substrate film 20 are preferably a film having a function of suppressing permeation of oxygen. In the above-mentioned embodiment, the substrate film has a configuration in which the barrier layers 12 and 22 are comprised on one surface of the support films 11 and 21, respectively. In such an aspect, the presence of the support films 11 and 21 improves the hardness of the light absorbing material-containing film and makes it possible to easily perform film formation. In the present embodiment, the substrate film has a configuration in which the barrier layers 12 and 22 are comprised on one surface of the support films 11 and 21, but the substrate film may be constituted by only a support having sufficient barrier properties.

The first substrate film 10 and the second substrate film 20 have a total light transmittance in the visible light region of preferably 80% or more and more preferably 85% or more. The visible light region refers to a wavelength range of 380 to 780 nm, and the total light transmittance refers to an average value of light transmittances over the visible light region.

The oxygen permeability of the first substrate film 10 and the second substrate film 20 is preferably 1.00 cc/(m²·day·atm) or less. The oxygen permeability is more preferably 0.1 cc/(m²·day·atm) or less, still more preferably 0.01 cc/(m²·day·atm) or less, and particularly preferably 0.001 cc/(m²·day·atm) or less. The oxygen permeability here is a value measured using an oxygen gas permeability measuring apparatus (OX-TRAN 2/20, trade name, manufactured by MOCON Inc.) under conditions of a measurement temperature of 23° C. and a relative humidity of 90%.

In addition to having a gas barrier function of blocking oxygen, the first substrate film 10 and the second substrate film 20 preferably have a function of blocking moisture (water vapor). The moisture permeability (water vapor permeability) of the first substrate film 10 and the second substrate film 20 is preferably 0.10 g/(m²·day·atm) or less and more preferably 0.01 g/(m²·day·atm) or less.

(Support Film)

The support films 11 and 21 are preferably a flexible belt-like support which is transparent to visible light. The phrase "transparent to visible light" as used herein means that the total light transmittance in the visible light region is 80% or more and preferably 85% or more. The light transmittance for use as a measure of transparency can be calculated by the method described in JIS-K7105, namely, by measuring a total light transmittance and an amount of scattered light using an integrating sphere type light transmittance measuring apparatus, and subtracting the diffuse transmittance from the total light transmittance. With respect to the flexible support, reference can be made to paragraphs [0046] to [0052] of JP2007-290369A and paragraphs [0040] to [0055] of JP2005-096108A.

The support film preferably has barrier properties against oxygen and moisture. Preferred examples of such a support film include a polyethylene terephthalate film, a film made of a polymer having a cyclic olefin structure, and a polystyrene film.

The average film thickness of the support films 11 and 21 is preferably 10 to 500 μm, more preferably 20 to 400 μm, and still more preferably 30 to 300 μm from the viewpoint of impact resistance or the like of the light absorbing material-containing film. Since it is preferred that the absorbance of light having a wavelength of 450 nm is lower in an aspect of increasing the retroreflection of light as in a case where the concentration of the quantum dots contained in the light absorbing material-containing layer 30 is reduced or in a case where the thickness of the light absorbing material-containing layer 30 is reduced, the average film thickness of the support films 11 and 21 is preferably 40 μm or less and more preferably 25 μm or less from the viewpoint of suppressing reduction in luminance.

Further, in the support films 11 and 21, the in-plane retardation Re (589) at a wavelength of 589 nm is preferably 1000 nm or less, more preferably 500 nm or less, and still more preferably 200 nm or less.

In a case of inspecting the presence or absence of foreign matters and defects after preparing the light absorbing material-containing film, arranging two polarizing plates at the extinction position, inserting a light absorbing material-containing film therebetween and observing it makes it easy to find foreign matters and defects. In a case where the Re (589) of the support is within the above range, foreign matters and defects are more easily found at the time of inspection using a polarizing plate, which is thus preferable.

Here, the Re (589) can be measured by making light having an input wavelength of 589 nm incident in the normal direction of the film using an AxoScan OPMF-1 (manufactured by Opto Science, Inc.).

(Barrier Layer)

The first substrate film 10 and the second substrate film 20 preferably comprise barrier layers 12 and 22 containing at least one inorganic layer formed in contact with the surface of the support films 11 and 21 on the light absorbing material-containing layer 30 side. The barrier layers 12 and 22 may include at least one inorganic layer and at least one organic layer. Lamination of a plurality of layers in this way is preferable from the viewpoint of improving the light resistance due to being capable of further more enhancing barrier properties. On the other hand, the light transmittance of the substrate film tends to decrease as the number of layers to be laminated is increased, and therefore it is desirable to increase the number of laminated layers as long as a satisfactory light transmittance can be maintained.

The barrier layers 12 and 22 preferably have a total light transmittance in the visible light region of preferably 80% or more and an oxygen permeability of 1.00 cc/(m²·day·atm) or less.

The oxygen permeability of the barrier layers 12 and 22 is more preferably 0.1 cc/(m²·day·atm) or less, still more preferably 0.01 cc/(m²·day·atm) or less, and particularly preferably 0.001 cc/(m²·day·atm) or less.

A lower oxygen permeability is more preferable, and a higher total light transmittance in the visible light region is more preferable.

—Inorganic Layer—

The inorganic layer is a layer containing an inorganic material as a main component, is preferably a layer in which the inorganic material occupies 50% by mass or more, further 80% by mass or more, particularly 90% by mass or more, and is preferably a layer formed from only an inorganic material.

The inorganic layer is preferably a layer having a gas barrier function of blocking oxygen. Specifically, the oxygen permeability of the inorganic layer is preferably 1.00 cc/(m²·day·atm) or less. The oxygen permeability of the inorganic layer can be determined by attaching an inorganic layer to a detector of an oxygen concentration meter manufactured by Orbisphere Laboratories, through silicone grease, and then converting the oxygen permeability from the equilibrium oxygen concentration value. It is also preferred that the inorganic layer has a function of blocking water vapor.

Two or three or more inorganic layers may also be included in the barrier layer.

The thickness of the inorganic layer may be 1 to 500 nm, and is preferably 5 to 300 nm and more preferably 10 to 150 nm. This is because the film thickness of the inorganic layer in the above range is capable of suppressing reflection on the inorganic layer while achieving satisfactory barrier properties, whereby a laminated film with higher light transmittance can be provided.

The inorganic material constituting the inorganic layer is not particularly limited, and for example, a metal, or various inorganic compounds such as inorganic oxides, nitrides or oxynitrides can be used therefor. For elements constituting the inorganic material, silicon, aluminum, magnesium, titanium, tin, indium, and cerium are preferable, and these elements may be included singly or two or more thereof may be included. Specific examples of the inorganic compound include silicon oxide, silicon oxynitride, aluminum oxide, magnesium oxide, titanium oxide, tin oxide, an indium oxide alloy, silicon nitride, aluminum nitride, and titanium nitride. As the inorganic layer, a metal film, for example, an aluminum film, a silver film, a tin film, a chromium film, a nickel film, or a titanium film may also be provided.

It is particularly preferred that the inorganic layer having barrier properties is an inorganic layer containing at least one compound selected from silicon nitride, silicon oxynitride, silicon oxide, or aluminum oxide, among the above-mentioned materials. This is because the inorganic layer formed of such a material is satisfactory in adhesiveness to the organic layer, and therefore, not only, even in a case where the inorganic layer has a pinhole, the organic layer can effectively fill in the pinhole to suppress fracture, but also, even in a case where the inorganic layer is laminated, an extremely satisfactory inorganic layer film can be formed to result in a further enhancement in barrier properties. From the viewpoint of suppressing absorption of light in the barrier layer, silicon nitride is most preferable.

The method of forming an inorganic layer is not particularly limited, and for example, a variety of film forming methods capable of evaporating or scattering a film forming material and depositing it on the deposition target surface can be used.

Examples of the method of forming an inorganic layer include a physical vapor deposition method (PVD method) such as a vacuum vapor deposition method of heating an inorganic material such as an inorganic oxide, an inorganic nitride, an inorganic oxynitride, or a metal to cause vapor deposition thereof; an oxidation reaction vapor deposition method of using an inorganic material as a starting material and introducing oxygen gas for oxidation to cause vapor deposition thereof; a sputtering method of using an inorganic material as a target starting material and introducing argon gas or oxygen gas for sputtering to cause vapor deposition; or an ion plating method of causing heating of an inorganic material by a plasma beam generated by a plasma gun to cause vapor deposition; and a plasma chemical vapor deposition method (CVD method) of using an organosilicon compound as a starting material in a case of forming a vapor deposited film of silicon oxide.

—Organic Layer—

The organic layer refers to a layer containing an organic material as a main component, in which the organic material preferably occupies 50% by mass or more, more preferably 80% by mass or more, and particularly preferably 90% by mass or more.

With respect to the organic layer, reference can be made to paragraphs [0020] to [0042] of JP2007-290369A and paragraphs [0074] to [0105] of JP2005-096108A. It is preferred that the organic layer contains a cardo polymer within a range satisfying the above-mentioned adhesion force conditions. This is because adhesiveness to the layer adjacent to the organic layer, in particular, also adhesiveness to the inorganic layer can be thus improved to achieve excellent gas barrier properties. With respect to details of the cardo polymer, reference can be made to paragraphs [0085] to [0095] of JP2005-096108A described above.

The film thickness of the organic layer is preferably 0.05 to 10 μm and more preferably 0.5 to 10 μm. In a case where the organic layer is formed by a wet coating method, the film thickness of the organic layer is preferably 0.5 to 10 μm and more preferably 1 to 5 μm. In a case where the organic layer is formed by a dry coating method, the film thickness of the organic layer is preferably 0.05 to 5 μm and more preferably 0.05 to 1 μm. This is because the film thickness of the organic layer formed by a wet coating method or a dry coating method in the above-specified range is capable of further improving adhesiveness to the inorganic layer.

With respect to other details of the inorganic layer and the organic layer, reference can be made to the descriptions of JP2007-290369A and JP2005-096108A described above and US2012/0113672A1.

In the light absorbing material-containing film, the organic layer may be laminated as the underlayer of the inorganic layer between the support film and the inorganic layer, and may be laminated as the protective layer of the inorganic layer between the inorganic layer and the light absorbing material-containing layer. Further, in a case of having two or more inorganic layers, the organic layer may be laminated between the inorganic layers.

(Concavity-Convexity Imparting Layer)

The substrate films 10 and 20 may comprise a concavity-convexity imparting layer for imparting a concave-convex structure on the surface opposite to the surface on the light absorbing material-containing layer 30 side. In a case where the substrate films 10 and 20 have a concavity-convexity imparting layer, the blocking property and sliding property of the substrate film can be improved, which is thus preferable. The concavity-convexity imparting layer is preferably a layer containing particles. Examples of the particles include inorganic particles such as silica, alumina, or metal oxide, and organic particles such as crosslinked polymer particles. The concavity-convexity imparting layer is preferably provided on the surface opposite to the light absorbing material-containing layer of the substrate film, but it may be provided on both surfaces.

The light absorbing material-containing film can have a light scattering function to efficiently extract the fluorescence of quantum dots to the outside. The light scattering function may be provided inside the light absorbing material-containing layer 30 or a layer having a light scattering function may be separately provided as the light scattering layer. The light scattering layer may be provided on the surface on the side of the light absorbing material-containing layer 30 of the substrate films 10 and 20 or may be provided on the surface on the side opposite to the light absorbing material-containing layer 30 of the substrate films 10 and 20. In a case where the concavity-convexity imparting layer is provided, it is preferred that the concavity-convexity imparting layer is a layer which can also serve as the light scattering layer.

<Production Method of Light Absorbing Body-Containing Film>

Next, an example of production steps of the light absorbing material-containing film according to the embodiment of the present invention configured as described above will be described.

First, an example of the production steps of the light absorbing material-containing film of the first aspect will be described.

(Coating Liquid Preparation Step)

In the first coating liquid preparation step, a coating liquid for forming a light absorption region containing quantum dots (or quantum rods) as light absorbing bodies is prepared. Specifically, individual components such as quantum dots dispersed in an organic solvent, a curable compound, a polymerization initiator, and a silane coupling agent are mixed in a tank or the like to prepare a coating liquid for forming a light absorption region. Note that the coating liquid for forming a light absorption region may not contain an organic solvent.

In the second coating liquid preparation step, a coating liquid for a resin layer to be filled between the light absorption regions is prepared.

(Resin Layer Forming Step)

Figure 17:
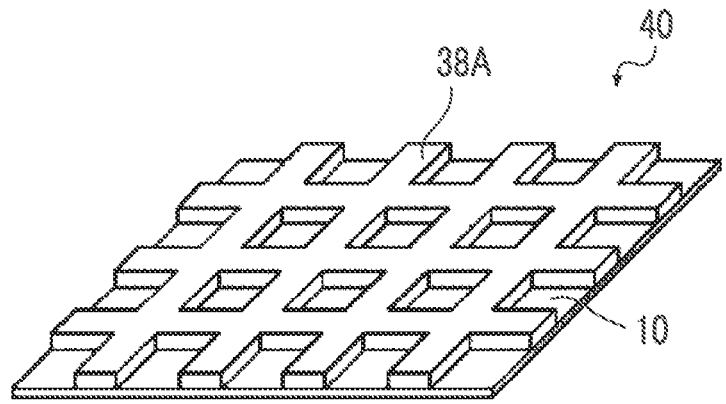
FIG. 17 is a schematic view for explaining an example of a method of preparing the light absorbing material-containing film of the present invention.

Next, a coating liquid for a resin layer is applied onto the first substrate film 10, and a mold having a concavo-convex pattern is pressed against the applied coating liquid for a resin layer to form a predetermined pattern having a concave portion, and the coating liquid for a resin layer is cured to form a laminated film 40 in which the resin layer 38A having a plurality of concave portions is laminated on the first substrate film 10, as shown in FIG. 17.

(Light Absorption Region Forming Step and Second Substrate Film Adhesion Step)

Figure 18:
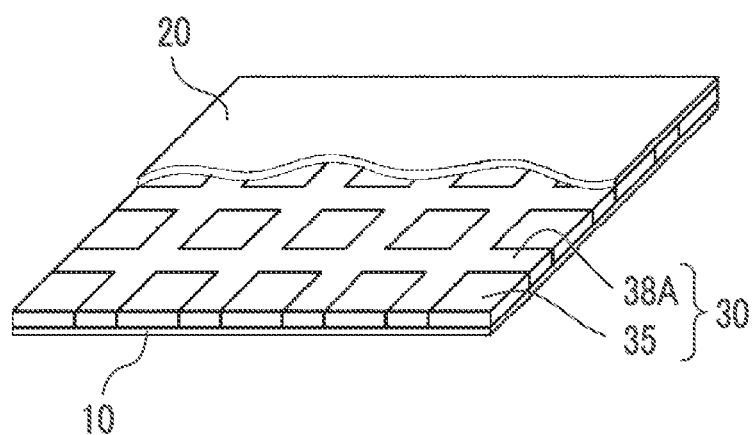
FIG. 18 is a schematic view for explaining an example of the method of preparing the light absorbing material-containing film of the present invention.

Next, the coating liquid for forming a light absorption region is applied into the concave portion of the resin layer 38A of the laminated film 40, the second substrate film 20 is adhered before curing the coating liquid for forming a light absorption region, and then the coating liquid for forming a light absorption region is cured to form a light absorption region 35 to prepare a light absorbing material-containing film in which the first substrate film 10, the light absorbing material-containing layer 30, and the second substrate film 20 are laminated, as shown in FIG. 18.

With respect to the curing treatment in the light absorption region forming step and the resin layer forming step, thermal curing, photocuring with ultraviolet light, or the like may be appropriately selected depending on the coating liquid.

In a case where the resin layer 38A is cured by photocuring with ultraviolet light, the irradiation amount of ultraviolet light is preferably 100 to 10000 mJ/cm$^2$.

In a case where the resin layer 38A is cured by thermal curing, it is preferable to heat the resin layer 38A to 20° C. to 100° C.

(Cutting Process)

The obtained light absorbing body-containing film is cut into a desired size by a cutting machine.

Next, an example of the production steps of the light absorbing material-containing film of the second aspect will be described.

(Coating Liquid Preparation Step)

The first coating liquid preparation step of preparing the coating liquid for forming a light absorption region is the same as in the first aspect.

In the second coating liquid preparation step, a coating liquid for forming a frame surrounding the light absorption region is prepared. Specifically, individual components such as the second light absorbing body, the curable compound, and the polymerization initiator are mixed in a tank or the like to prepare a coating liquid for forming a frame. The coating liquid for forming a frame may or may not contain an organic solvent.

(Frame Forming Step)

Figure 19:
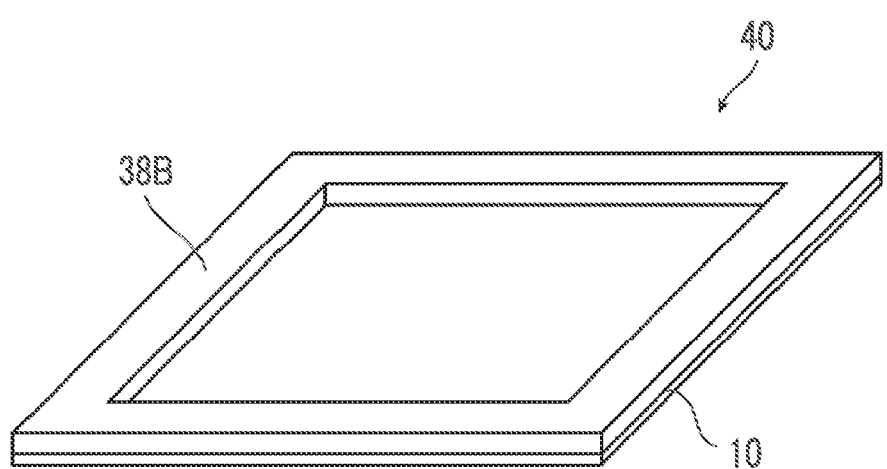
FIG. 19 is a schematic view for explaining an example of the method of preparing the light absorbing material-containing film of the present invention.

Next, the coating liquid for forming a frame is poured into a mold having a concavo-convex pattern, the first substrate film 10 is bonded to the surface thereof, and the coating liquid for forming a frame is cured to form a laminated film 40 in which the frame 38B is laminated on the first substrate film 10, as shown in FIG. 19.

(Light Absorption Region Forming Step, and Second Substrate Film Adhesion Step)

Figure 20:
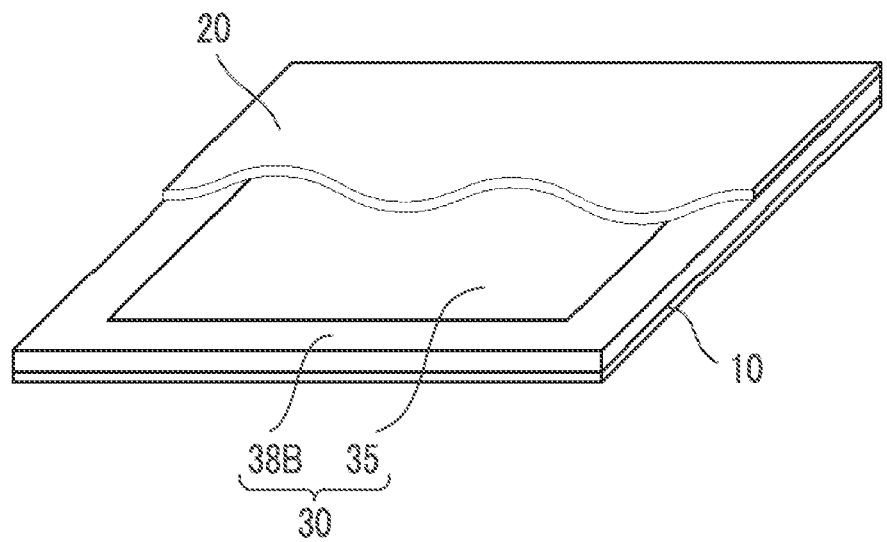
FIG. 20 is a schematic view for explaining an example of the method of preparing the light absorbing material-containing film of the present invention.

Next, the coating liquid for forming a light absorption region is filled inside the frame 38B of the laminated film 40, the second substrate film 20 is adhered before curing the coating liquid for forming a light absorption region, then the coating liquid for forming a light absorption region is cured to form the light absorption region 35 to prepare a light absorbing material-containing film in which the first substrate film 10, the light absorbing material-containing layer 30, and the second substrate film 20 are laminated, as shown in FIG. 20.

The curing treatment in the light absorption region forming step and the frame forming step may be appropriately selected from thermal curing or photocuring with ultraviolet light, depending on the coating liquid.

In a case where the frame 38B is cured by photocuring with ultraviolet light, the irradiation dose of ultraviolet light is preferably 100 to 10000 mJ/cm$^2$.

In a case where the frame 38B is cured by thermal curing, it is preferable to heat the frame 38B to 20° C. to 100° C.

(Cutting Process)

The obtained light absorbing body-containing film is cut into a desired size by a cutting machine.

In each case of the first aspect and the second aspect, as for the method of preparing the light absorbing material-containing film, each of the above-described steps may be carried out continuously by a so-called roll-to-roll (RtoR) process, or alternatively, the treatment of each step may be carried out in a so-called single wafer type using the substrate film in the form of a cut sheet. From the viewpoint of productivity, it is preferable to prepare the light absorbing material-containing film by a roll-to-roll method.

Further, as for the formation of the resin layer having a plurality of concave portions (concavo-convex patterns) and the formation of the frame, as described above, the resin layer or frame can be formed by pouring the coating liquid into a mold having a concave portion corresponding to the shape of the resin layer or frame, but the method is not limited thereto. For example, it is possible to use a method in which a frame is formed by pressing a mold having a concavo-convex pattern against a coating liquid applied onto a substrate film. Further, it is also possible to form a resin layer and a frame by an inkjet method, a dispenser method, or a printing method.

The mold usable herein is a mold having a concavo-convex pattern to be transferred. The pattern on the mold may be formed according to desired processing accuracy, for example, by photolithography, electron beam lithography, or the like, but the method of forming a mold pattern is not particularly limited.

The light-transmissive mold material is not particularly limited, but any material having predetermined strength and durability may be used. Specific examples thereof include glass, quartz, a light-transparent resin such as PMMA or polycarbonate resin, a transparent metal vapor-deposited film, a flexible film made of polydimethylsiloxane or the like, a photocured film, and a metal film such as SUS.

On the other hand, the non-light-transmissive mold material is not particularly limited, but any material having a predetermined strength may be used. Specific examples of the mold material include a ceramic material, a vapor deposited film, a magnetic film, a reflective film, a metal substrate such as Ni, Cu, Cr, Fe or the like, and a substrate of SiC, silicon, silicon nitride, polysilicon, silicon oxide, amorphous silicon or the like. Further, the shape of the mold is not particularly limited, either a plate-like mold or a roll-like mold may be used. The roll-like mold is applied particularly in a case where continuous productivity of transfer is required.

A mold may be used which has been subjected to a surface release treatment in order to improve releasability between the curable compound and the mold surface. Such a mold may be, for example, a mold coated with a material having excellent water and oil repellency. Specifically, those in which polytetrafluoroethylene (PTFE) or diamond-like carbon (DLC) is vapor-deposited by physical vapor deposition (PVD) or chemical vapor deposition (CVD), and those treated with a silane coupling agent such as a silicone-based silane coupling agent or a fluorine-based silane coupling agent are exemplified, and in surface release treatment, for example, commercially available releasing agents such as OPTOOL DSX (manufactured by Daikin Industries, Ltd.) and Novec EGC-1720 (manufactured by Sumitomo 3M Ltd.) can also be suitably used.

Specific examples of a method for forming the concavo-convex pattern using the mold include a thermal imprinting method in which a mold is pressed against a resin layer (frame) applied and cured on a substrate film in a state where the resin layer (frame) or the mold is heated to form a concavo-convex pattern; a photoimprinting method in which a mold having a concavo-convex pattern is pressed against a coating liquid applied on a substrate film, and then the resin layer (frame) is cured with light to form a concavo-convex pattern; and a melt molding method for forming a concavo-convex pattern. Among them, a photoimprinting method is preferable from the viewpoint of excellent production rate and low capital investment.

In a case where photoimprint lithography is carried out, it is usually preferable to carry out the lithography at a mold pressure of 10 atm or less. In a case where the mold pressure is set to 10 atm or less, the mold and the substrate are hardly deformed and the pattern accuracy tends to improve. In addition, it is preferable from the viewpoint that the apparatus may be small-sized since the pressure to be given to the mold may be low. Regarding the mold pressure, it is preferable to select a region where uniformity of mold transfer can be secured within the range where the residual film of the curable compound in the area of mold pattern projections is reduced.

The irradiation dose of photo-irradiation in the curing treatment may be sufficiently larger than the irradiation dose necessary for curing. The irradiation dose necessary for curing is appropriately determined by examining the consumption amount of unsaturated bonds of the curable composition and the tackiness of the cured film.

In the photoimprint lithography, photo-irradiation is carried out while keeping the substrate temperature generally at room temperature, in which the photo-irradiation may alternatively be conducted under heating for the purpose of enhancing the reactivity. The photo-irradiation may be carried out in vacuo, since a vacuum conditioning prior to the photo-irradiation is effective for preventing entrainment of bubbles, suppressing the reactivity from being reduced due to incorporation of oxygen, and for improving the adhesiveness between the mold and the curable composition. In the pattern forming method, the degree of vacuum at the time of photo-irradiation is preferably in the range of $10^{-1}$ Pa to 1 atm.

The light used for curing the curable compound is not particularly limited, and examples thereof include light and radiation having a wavelength falling within a range of high-energy ionizing radiation, near ultraviolet light, far ultraviolet light, visible light, infrared light, and the like. The high-energy ionizing radiation source includes, for example, accelerators such as a Cockcroft accelerator, a Van de Graaff accelerator, a linear accelerator, a betatron, and a cyclotron. The electron beams accelerated by such an accelerator are used industrially most conveniently and economically; but any other radioisotopes and other radiations from nuclear reactors, such as γ-rays, X-rays, α-rays, neutron beams, and proton beams may also be used. Examples of the ultraviolet light source include an ultraviolet fluorescent lamp, a low-pressure mercury lamp, a high-pressure mercury lamp, an ultra-high-pressure mercury lamp, a xenon lamp, a carbon arc lamp, a solar lamp, and a light emitting diode (LED). Examples of the radiation include microwaves and extreme ultraviolet (EUV). In addition, laser light used in microfabrication of semiconductors, such as LED, semiconductor laser light, 248 nm KrF excimer laser light, and 193 nm ArF excimer laser light, can also be suitably used in the present invention. The light may be monochromatic light or may also be a plurality of light rays of different wavelengths (mixed light).

Upon exposure, the exposure illuminance is preferably within a range of 1 to 1000 mW/cm$^2$. In a case where the exposure illuminance is set to 1 mW/cm$^2$ or more, then the productivity may increase since the exposure time may be reduced; and in a case where the exposure illuminance is set to 1000 mW/cm$^2$ or less, then it is preferable since the properties of a permanent film may be prevented from being degraded owing to side reactions.

The exposure dose is preferably in the range of 5 to 10,000 mJ/cm$^2$. In a case where the exposure dose is less than 5 mJ/cm$^2$, the exposure margin becomes narrow and the photocuring becomes insufficient so that problems such as adhesion of unreacted materials to the mold are liable to occur. On the other hand, in a case where the exposure dose is more than 10,000 mJ/cm$^2$, there is a risk of deterioration of the permanent film due to decomposition of the composition.

Further, at the time of exposure, in order to prevent inhibition of radical polymerization by oxygen, an inert gas such as nitrogen or argon may be flowed to control the oxygen concentration to be less than 100 mg/L.

In the curing treatment, after the curable compound is cured through photo-irradiation, a step of further curing the curable compound by applying heat thereto may be included as necessary. The temperature of heat for curing with heating after photo-irradiation is preferably 80° C. to 280° C. and more preferably 100° C. to 200° C. The time for applying heat is preferably 5 to 60 minutes and more preferably 15 to 45 minutes.

In the first aspect, the concavo-convex pattern formed in the resin layer can take any form. For example, there are a lattice-like mesh pattern in which the opening shape of the concave portion or the shape of the convex portion is quadrangular or rectangular; a honeycomb pattern in which a concave portion or a convex portion is regular hexagonal; a sea island pattern in which a concave portion or a convex portion is circular; a compound pattern such as a combination of a regular pentagon/a regular hexagon as a concave portion or a convex portion, or a combination of circular shapes with different diameters; and a pattern with in-plane distribution in size of hexagon.

Above all, from the viewpoint of suppressing defects of a septum at the time of releasing a resin layer from a mold in a case of forming the resin layer by a photoimprinting method, a regular polygonal pattern such as a square or regular hexagonal pattern, and a circular pattern are preferable.

Further, in the above example, the step of curing the resin layer (frame) is carried out in a state where the mold is attached, but it may be carried out after releasing of the mold. It is preferable to carry out the step of curing the resin layer in a state where the mold is closely attached.

In a case of carrying out a thermal imprinting method, it is usually preferably carried out at a mold pressure in the range of 0.1 to 100 MPa. In addition, it is preferable to set the temperature of the mold and the resin layer (frame) within a predetermined range. Generally, it is often to set the mold temperature to be equal to or higher than the glass transition temperature (Tg) of the resin layer (frame), and set the substrate temperature lower than the mold temperature.

In a case of carrying out a melt molding method, a resin to be molded is heated to a temperature equal to or higher than the melting point thereof, and the resin (melt) in a molten state is immediately flowed between the mold and the substrate film, followed by pressing and cooling to prepare a molded article. A polymer having a low oxygen permeability is preferable as a material suitable for the resin layer (frame) in a case of carrying out the melt molding method. Specific examples of such a polymer include polyester-based resins such as polyvinyl alcohol (PVA), polyethylene-vinyl alcohol copolymer (EVOH), polyvinylidene chloride (PVDC), polyvinylidene fluoride (PVDF), and polyethylene terephthalate (PET). Among them, (modified) polyvinyl alcohol is preferable and polyethylene-vinyl alcohol copolymer (EVOH) is particularly preferable from the viewpoint of excellent transparency and excellent heat resistance and light resistance.

An anchor coat layer may be provided on the substrate film in order to ensure adhesiveness between the resin layer (frame) and the substrate film. The material of the anchor coat layer is appropriately selected according to the material of the resin layer (frame) and the substrate film. For example, in a case where the resin layer (frame) is EVOH and the substrate film is PET, a urethane-based compound, a polyethyleneimine-based compound, a polybutadiene-based compound, or a (modified) polyolefin-based compound can be mentioned as the material of the anchor coat layer. From the viewpoint of excellent water resistance and adhesion force, an anchor coat material of a urethane-based compound or a (modified) polyolefin-based compound is most preferable. Specific examples of products include EL-530A/B (manufactured by Toyo-Morton, Ltd.), and TAKELAC A/TAKENATE A series, ADMER series, UNISTOLE series (all manufactured by Mitsui Chemicals, Inc.).

"Backlight Unit"

Figure 21:
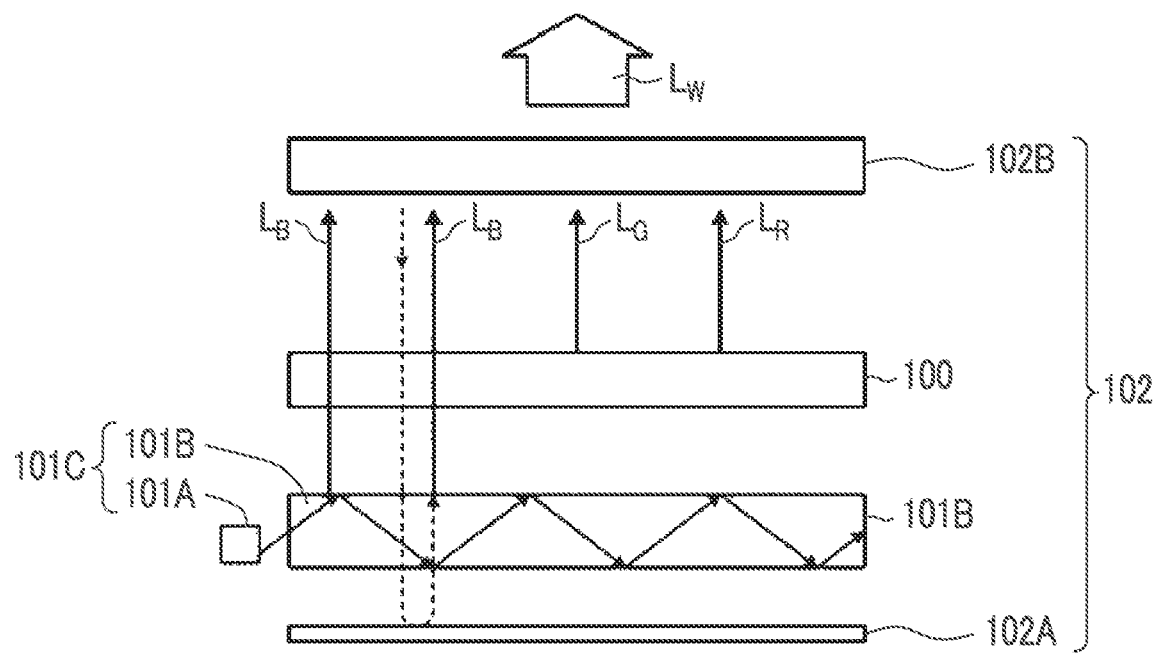
FIG. 21 is a cross-sectional view of a schematic configuration of a backlight unit comprising a light absorbing material-containing film as a wavelength conversion member.

With reference to the drawings, a description will be given of a backlight unit comprising a wavelength conversion member as one embodiment of the light absorbing material-containing film according to the embodiment of the present invention. FIG. 21 is a schematic view showing a side edge type backlight as an example of a schematic configuration of the backlight unit.

As shown in FIG. 21, the backlight unit 102 comprises a planar light source 101C including a light source 101A that emits primary light (blue light $L_B$) and a light guide plate 101B that guides and emits primary light emitted from the light source 101A, a wavelength conversion member 100 made of a light absorbing material-containing film comprised in the planar light source 101C, a reflective plate 102A disposed opposite to the wavelength conversion member 100 with the planar light source 101C interposed therebetween, and a retroreflective member 102B. In FIG. 21, the reflective plate 102A, the light guide plate 101B, the wavelength conversion member 100, and the retroreflective member 102B are spaced apart from one another, but this shows that those components are not optically in intimate attachment with one another, and those components may actually be laminated.

The wavelength conversion member 100 emits fluorescence by using at least a part of the primary light $L_B$ emitted from the planar light source 101C as excitation light and emits the secondary light (green light $L_G$ and red light $L_R$) composed of this fluorescence and the primary light $L_B$ transmitted through the wavelength conversion member 100. For example, the wavelength conversion member 100 is a light absorbing material-containing film which is constituted such that the light absorbing material-containing layers including the quantum dots that emit the green light $L_G$ and the quantum dots that emit the red light $L_R$ upon irradiation with the blue light $L_B$ are sandwiched between the first substrate film and the second substrate film.

In FIG. 21, $L_B$, $L_G$, and $L_R$ emitted from the wavelength conversion member 100 are incident on the retroreflective member 102B, and each incident light repeats reflection between the retroreflective member 102B and the reflective plate 102A and passes through the wavelength conversion member 100 many times. As a result, in the wavelength conversion member 100, a sufficient amount of excitation light (blue light $L_B$) is absorbed by the light absorbing bodies 31 (in this case, quantum dots) in the light absorbing material-containing layer 30 and a necessary amount of fluorescence ($L_G$ and $L_R$) is emitted, and the white light $L_W$ is embodied from the retroreflective member 102B and is emitted.

From the viewpoint of realizing high luminance and high color reproducibility, it is preferred to use, as the backlight unit, one formed into a multi-wavelength light source. For example, preferred is a backlight unit which emits blue light having a luminescence center wavelength in the wavelength range of 430 to 480 nm and having a luminescence intensity peak with a half-width of 100 nm or less, green light having a luminescence center wavelength in the wavelength range of 500 to 600 nm and having a luminescence intensity peak with a half-width of 100 nm or less, and red light having a luminescence center wavelength in the wavelength range of 600 to 680 nm and having a luminescence intensity peak with a half-width of 100 nm or less.

From the viewpoint of further improving luminance and color reproducibility, the wavelength range of the blue light emitted from the backlight unit is more preferably 440 to 460 nm.

From the same viewpoint, the wavelength range of the green light emitted from the backlight unit is preferably 520 to 560 nm and more preferably 520 to 545 nm.

In addition, from the same viewpoint, the wavelength range of the red light emitted from the backlight unit is more preferably 610 to 650 nm.

In addition, from the same viewpoint, all the half-widths of the respective luminescence intensities of the blue light, the green light, and the red light emitted from the backlight unit are preferably 80 nm or less, more preferably 50 nm or less, still more preferably 40 nm or less, and particularly preferably 30 nm or less. Among them, the half-width of the luminescence intensity of the blue light is particularly preferably 25 nm or less.

In the above description, the light source 101A is, for example, a blue light-emitting diode that emits blue light having a luminescence center wavelength in the wavelength range of 430 nm to 480 nm, but an ultraviolet light-emitting diode that emits ultraviolet light may be used. As the light source 101A, a laser light source or the like may be used in addition to light emitting diodes. In a case of comprising a light source that emits ultraviolet light, the wavelength conversion layer (light absorbing body-containing layer) of the wavelength conversion member may include a phosphor (light absorbing body) that emits blue light, a phosphor (light absorbing body) that emits green light, and a phosphor (light absorbing body) that emits red light, upon irradiation with ultraviolet light.

(Configuration of Backlight Unit)

In FIG. 21, an edge light mode backlight unit including a light guide plate, a reflective plate, and the like as constituent members has been illustrated as the configuration of the backlight unit, but the backlight unit may be a direct backlight mode backlight unit in which a plurality of light sources are disposed on a reflective plate and which comprises a diffusion plate. A known light guide plate can be used without any limitation as the light guide plate.

In addition, the reflective plate 102A is not particularly limited, and known reflective plates can be used, which are described in JP3416302B, JP3363565B, JP4091978B, and JP3448626B, and the like, the contents of which are incorporated by reference herein in their entirety.

The retroreflective member 102B may be configured of a known diffusion plate or a known diffusion sheet, a known prism sheet (for example, BEF series manufactured by Sumitomo 3M Limited), a known light guide device, and the like. The configuration of the retroreflective member 102B is described in JP3416302B, JP3363565B, JP4091978B, JP3448626B, and the like, the contents of which are incorporated by reference herein in their entirety.

In order to improve the uniformity of the backlight light, an optical sheet having light diffusivity can be disposed on the light absorbing body film. Such an optical sheet having light diffusivity may have a uniform light diffusivity or may have a distribution in the plane.

"Liquid Crystal Display"

The backlight unit 102 described above can be applied to a liquid crystal display. FIG. 22 is a schematic view showing a schematic configuration of a liquid crystal display.

As shown in FIG. 22, a liquid crystal display 104 comprises the backlight unit 102 of the above-described embodiment, and a liquid crystal cell unit 103 disposed opposite to the retroreflective member side of the backlight unit.

As shown in FIG. 22, the liquid crystal cell unit 103 has a configuration in which a liquid crystal cell 110 is sandwiched between polarizing plates 120 and 130, and the polarizing plates 120 and 130 are configured such that both main surfaces of polarizers 122 and 132 are protected by polarizing plate protective films 121 and 123, and 131 and 133, respectively.

The liquid crystal cell 110 and the polarizing plates 120 and 130 constituting the liquid crystal display 104 and the constituent elements thereof are not particularly limited, and members prepared by a known method or commercially available products can be used without any limitation. In addition, it is also possible, of course, to provide a known interlayer such as an adhesive layer between the respective layers.

A driving mode of the liquid crystal cell 110 is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. The driving mode of the liquid crystal cell is preferably a VA mode, an OCB mode, an IPS mode, or a TN mode, but it is not limited thereto. An example of the configuration of the liquid crystal display in the VA mode may be the configuration illustrated in FIG. 2 of JP2008-262161A. Here, a specific configuration of the liquid crystal display is not particularly limited, and a known configuration can be adopted.

If necessary, the liquid crystal display 104 further includes a subsidiary functional layer such as an optical compensation member performing optical compensation or an adhesive layer. In addition, a surface layer such as a forward scattering layer, a primer layer, an antistatic layer, or an undercoat layer may be disposed along with (or in place of) a color filter substrate, a thin layer transistor substrate, a lens film, a diffusion sheet, a hard coat layer, an antireflection layer, a low reflective layer, an antiglare layer, or the like.

The backlight side polarizing plate 120 may include a phase difference film as a polarizing plate protective film 123 on the liquid crystal cell 110 side. A known cellulose acylate film or the like can be used as such a phase difference film.

The backlight unit 102 and the liquid crystal display 104 are comprised of the wavelength conversion member made of the light absorbing material-containing film according to the embodiment of the present invention described above. Accordingly, a high-luminance backlight unit and a high-luminance liquid crystal display, which exhibit the same effect as that of the above-mentioned light absorbing body-containing film according to the embodiment of the present invention and in which the luminescence intensity of the wavelength conversion layer containing quantum dots is hardly lowered, are obtained.

EXAMPLES

Hereinafter, the present invention will be more specifically described with reference to Examples. The materials, use amounts, proportions, treatment contents, treatment procedures, and the like shown in the following Examples can be appropriately modified without departing from the spirit of the present invention. Therefore, the scope of the present invention should not be construed as being limited to the following specific Examples.

Example 1

<Preparation of Light Absorbing Body-Containing Film>

As a light absorbing material-containing film of the first aspect, a light absorbing material-containing film having a light absorbing material-containing layer was prepared using a coating liquid containing quantum dots as light absorbing bodies.

(Preparation of Barrier Film)

As a first substrate film and a second substrate film, a barrier film in which a barrier layer made of an inorganic layer was formed on a support film made of PET, and an organic layer coated with the following composition was formed on the barrier layer was prepared as follows.

Using a PET film (manufactured by Toyobo Co., Ltd., trade name "COSMOSHINE (registered trademark) A4300", thickness: 23 μm) as a support, an organic layer and an inorganic layer were sequentially formed on one side of the support by the following procedure.

—Formation of Organic Layer—

Trimethylolpropane triacrylate (product name "TMPTA", manufactured by Daicel-Allnex Ltd.) and a photopolymerization initiator (trade name "ESACURE (registered trademark) KT046", manufactured by Lamberti S.p.A.) were prepared and weighed in a mass ratio of 95:5, and these were dissolved in methyl ethyl ketone to prepare a coating liquid having a solid content concentration of 15%. This coating liquid was applied on a PET film in a roll-to-roll process using a die coater and passed through a drying zone at 50° C. for 3 minutes. Thereafter, the coated film was irradiated with ultraviolet light under a nitrogen atmosphere (cumulative irradiation dose: about 600 mJ/cm$^2$), cured by ultraviolet curing, and wound up. The thickness of the organic layer formed on the support was 1 μm.

—Formation of Inorganic Layer—

Next, an inorganic layer (silicon nitride layer) was formed on the surface of the organic layer by using a roll-to-roll CVD apparatus. Silane gas (flow rate: 160 sccm), ammonia gas (flow rate: 370 sccm), hydrogen gas (flow rate: 590 sccm), and nitrogen gas (flow rate: 240 sccm) were used as raw material gases. As a power source, a high-frequency power source with a frequency of 13.56 MHz was used. The film forming pressure was 40 Pa, and the film thickness reached was 50 nm. In this manner, a barrier film was prepared in which an inorganic layer was laminated on the surface of the organic layer formed on the support.

Further, a second organic layer was laminated on the surface of the inorganic layer. For the second organic layer, 5.0 parts by mass of a photopolymerization initiator (trade name "IRGACURE 184", manufactured by BASF Corporation) was weighed with respect to 95.0 parts by mass of a urethane skeleton acrylate polymer (trade name "ACRIT 8BR 930", manufactured by Taisei Fine Chemical Co., Ltd.) and these materials were dissolved in methyl ethyl ketone to prepare a coating liquid having a solid content concentration of 15%.

This coating liquid was applied directly to the surface of the inorganic layer in a roll-to-roll process using a die coater and passed through a drying zone at 100° C. for 3 minutes. Thereafter, the coated film was cured by irradiation with ultraviolet light (cumulative irradiation dose of about 600 mJ/cm$^2$) while being held by a heat roll heated to 60° C., and wound up. The thickness of the second organic layer formed on the support was 1 μm. In this manner, a barrier film with a second organic layer was prepared.

In a case where the oxygen permeability of this barrier film was measured using OX-TRAN 2/20 (manufactured by MOCON Inc.), it showed a value of 4.0×10$^{-3}$ cc/(m$^2$·day·atm) or less.

(Formation of Resin Layer)

As a coating liquid 1 for forming a resin layer, individual components such as a curable compound, a polymerization initiator, and a silane coupling agent were mixed by a tank or the like to prepare a coating liquid.

—Composition of Coating Liquid 1 of Resin Layer—

A coating liquid for a resin layer having the following composition was prepared to obtain a coating liquid 1.

| | |
|---|---|
| Tricyclodecane dimethanol diacrylate (A-DCP, manufactured by Shin-Nakamura Chemical Co., Ltd.) | 84 parts by mass |
| Synthetic plate-like alumina, average particle diameter: 2.0 μm (SERAPH, manufactured by Kinsei Matec Co., Ltd.) | 15 parts by mass |
| Photopolymerization initiator (IRGACURE 819, manufactured by BASF Corporation) | 1 part by mass |

A-DCP

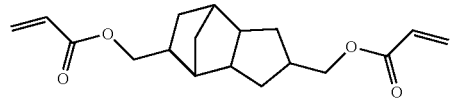 [SMILES: C=CC(=O)OCC1CC2C3CC(COC(=O)C=C)C(C3)C2C1]

—Formation of Resin Layer—

The coating liquid 1 for a resin layer was applied onto the first substrate film, and the concave portions were transferred, followed by photocuring to form a resin layer 38A having a plurality of concave portions. For the mold used for transferring, one having a rounded corner portion of the concave portion with radius of curvature of 10 μm was used.

The concave portion had a square shape of 250×250 μm and was formed in a lattice-like pattern (width of light absorption region: 250 μm).

Here, in a certain region of 155×98 mm, the depth of the concave portion in the region up to 1 cm inside including the ends of the four sides was 100 μm, and the width of the resin layer 38A between the adjacent concave portions was 50 μm; and the depth of the concave portion in the other regions was 50 μm, and the width of the resin layer 38A between the adjacent concave portions was 50 μm. That is, this example was configured such that a concave portion (light absorption region) in the central portion having a depth of 50 μm was surrounded by a concave portion (light absorption region) in the peripheral portion having a depth of 100 μm.

For photocuring, the resin layer was cured by irradiation with ultraviolet light at a dose of 500 mJ/cm$^2$ from the first substrate film side using an air-cooled metal halide lamp (manufactured by Eye Graphics Co., Ltd.) at 200 W/cm.

The modulus of elasticity of the resin layer after curing was 3.1 GPa, as measured according to the standards of JIS K7161.

(Formation of light absorption region and adhesion of substrate film)

As a coating liquid 2 forming a light absorption region, individual components such as quantum dots, a curable compound, and a polymerization initiator were mixed by a tank or the like to prepare a coating liquid.

—Composition of Coating Liquid 2 for Light Absorption Region—

A quantum dot dispersion liquid having the following composition was prepared to obtain a coating liquid 2.

| | |
|---|---|
| Toluene dispersion liquid of quantum dots 1 (emission maximum: 520 nm) | 20% by mass |
| Toluene dispersion liquid of quantum dots 2 (emission maximum: 630 nm) | 2% by mass |
| Dicyclopentanyl acrylate (DCP: FA-513AS, manufactured by Hitachi Chemical Co., Ltd.) | 78.8% by mass |
| Tricyclodecane dimethanol diacrylate (A-DCP, manufactured by Shin-Nakamura Chemical Co., Ltd.) | 20% by mass |
| Photopolymerization initiator (IRGACURE TPO, manufactured by BASF Corporation) | 0.2% by mass |

For the quantum dots 1 and 2, nanocrystals having the following core-shell structure (InP/ZnS) were used.

Quantum dots 1: INP 530-10 (manufactured by NN-Labs, LLC)

Quantum dots 2: INP 620-10 (manufactured by NN-Labs, LLC)

—Application of Coating Liquid for Forming Light Absorption Region and Adhesion of Substrate Film—

The coating liquid 2 for forming a light absorption region was applied onto a resin layer having a plurality of concave portions and a first substrate film so that the concave portions were filled with the coating liquid 2, and a second substrate film was adhered, followed by photocuring to form a light absorption region-containing layer in which light absorption regions were formed in a plurality of concave portions of the resin layer, thereby preparing a light absorbing material-containing film.

For photocuring, the light absorption region was cured by irradiation with ultraviolet light at a dose of 500 mJ/cm$^2$ from the first substrate film side using an air-cooled metal halide lamp (manufactured by Eye Graphics Co., Ltd.) at 200 W/cm. Next, a region of 155×98 mm where the concave portion was formed was cut out.

As described above, the light absorbing material-containing film 1 was obtained.

Example 2

A resin layer was formed and a light absorbing material-containing film 2 was obtained in the same manner as in Example 1, except that the depth of all concave portions (light absorption regions) was 50 μm, and the concave portion was 500×500 μm (width of resin layer: 50 μm) in the region up to 1 cm inside including the ends of the four sides. That is, this example was configured such that a concave portion (light absorption region with width of 250 μm) in the central portion of 250×250 μm was surrounded by a concave portion (light absorption region with width of 500 μm) in the peripheral portion of 500×500 μm.

Comparative Example 1

A resin layer was formed and a light absorbing material-containing film 3 was obtained in the same manner as in Example 1, except that the depth of the resin layer in the peripheral portion was all 50 μm.

Example 3

As the light absorbing material-containing film of the second aspect, a light absorbing material-containing film 4 was obtained in the same manner as in Example 1, except that a frame in place of the resin layer was formed in the following manner, and a light absorption region was formed in the frame.

(Formation of Frame)

Individual components such as a curable compound, a polymerization initiator, a second light absorbing body, and scattering particles were mixed by a tank or the like to prepare a coating liquid as a coating liquid 3 for forming a frame.

—Composition of Coating Liquid 3 for Forming Frame—

A coating liquid for a frame having the following composition was prepared to obtain a coating liquid 3.

| | |
|---|---|
| Tricyclodecane dimethanol diacrylate (A-DCP, manufactured by Shin-Nakamura Chemical Co., Ltd.) | 75 parts by mass |
| YAG phosphor (ZYP 550G3 (YUJI LED (manufactured by Yuji International Co., Ltd.))) | 10 parts by mass |
| Synthetic plate-like alumina, average particle diameter: 2.0 μm (SERAPH, manufactured by Kinsei Matec Co., Ltd.) | 14 parts by mass |
| Photopolymerization initiator (IRGACURE 819, manufactured by BASF Corporation) | 1 part by mass |

—Formation of Frame—

The coating liquid 3 for forming a frame was poured into the mold, and then the first substrate film was adhered and photocured to form a frame 38B on the first substrate film. For the mold used for forming a frame, one having a rounded corner portion of the concave portion with radius of curvature of 10 μm was used.

In addition, the frame had a rectangular shape with an outer periphery of 155 mm×98 mm, a triangular cross-sectional shape, a width of 1 mm, and a height of 70 μm. The radius of curvature of the vertex portion and the foot portion of the frame was 10 μm.

For photocuring, the frame was cured by irradiation with ultraviolet light at a dose of 500 mJ/cm$^2$ from the first substrate film side using an air-cooled metal halide lamp (manufactured by Eye Graphics Co., Ltd.) at 200 W/cm.

In a case where the oxygen permeability of the frame was measured by the above-described method, the oxygen permeability of the frame was 3 cc/(m$^2$·day·atm).

—Application of Coating Liquid for Forming Light Absorption Region and Adhesion of Substrate Film—

The coating liquid 2 for forming a light absorption region was applied inside the frame on the first substrate film, the inside of the frame was filled with the coating liquid 2, the second substrate film was adhered and photocured to form a light absorption region-containing layer having a frame surrounding the light absorption region and the light absorbing layer, whereby a light absorbing material-containing film was prepared.

For photocuring, the light absorption region was cured by irradiation with ultraviolet light at a dose of 500 mJ/cm$^2$ from the first substrate film side using an air-cooled metal halide lamp (manufactured by Eye Graphics Co., Ltd.) at 200 W/cm.

Next, a region of 155 mm×98 mm which is the outer peripheral portion of the frame was cut out.

In this manner, a light absorbing material-containing film 4 was obtained.

Example 4

A light absorbing material-containing film 5 was prepared in the same manner as in Example 3, except that the structure had three frames.

Three frames were provided in multiple such that the frames are of different sizes and large frames enclose small frames.

In addition, the outermost (largest) frame was rectangular with an outer periphery of 155 mm×98 mm, and the three frames had each a width of 0.3 mm. The distance between the frames was 3 mm.

Further, in any of the frames, the radius of curvature of the vertex portion and the foot portion was 10 μm.

Further, the light absorption region was filled between the outermost frame and the frame located in the middle, between the frame located in the middle and the frame located in the innermost side, and inside the frame located in the innermost side.

In a case where the oxygen permeability of the largest frame was measured by the above-described method, the oxygen permeability was 10 cc/(m$^2$·day·atm).

Further, a region of 155 mm×98 mm which is the outer peripheral portion of the large frame was cut out to obtain a light absorbing material-containing film 5.

Example 5

A light absorbing material-containing film 6 was prepared in the same manner as in Example 3, except that the structure had three frames.

Three frames were provided in multiple such that the frames are of different sizes and large frames enclose small frames.

In addition, the outermost (largest) frame was rectangular with an outer periphery of 155 mm×98 mm, and the frame had a width of 0.6 mm. Also, the distance between the inner periphery of the outermost frame and the outer periphery of the frame located in the middle was 3 mm, and the width of the frame located in the middle was 0.3 mm. Further, the distance between the inner periphery of the frame located in the middle and the outer periphery of the innermost (smallest) frame was 3 mm, and the width of the smallest frame was 0.2 mm.

Further, in any of the frames, the radius of curvature of the vertex portion and the foot portion was 10 μm.

Further, the light absorption region was filled between the outermost frame and the frame located in the middle, between the frame located in the middle and the frame located in the innermost side, and inside the frame located in the innermost side.

In a case where the oxygen permeability of the largest frame was measured by the above-described method, the oxygen permeability was 5 cc/(m²·day·atm).

Further, a region of 155 mm×98 mm which is the outer peripheral portion of the large frame was cut out to obtain a light absorbing material-containing film 6.

Example 6

A light absorbing material-containing film 7 was prepared in the same manner as in Example 3, except that the cross-sectional shape of the frame was changed to the following shape.

The cross-sectional shape of the frame was rectangular, and the radius of curvature was not given to the vertex portion and the foot portion. That is, as a mold used for forming a frame, one with a corner portion of the concave portion having no radius of curvature was used.

The oxygen permeability of the frame was 3 cc/(m²·day·atm).

Further, a region of 155 mm×98 mm which is the outer peripheral portion of the frame was cut out to obtain a light absorbing material-containing film 7.

Comparative Example 2

A light absorbing material-containing film was prepared in the same manner as in Example 3, except that the light absorption region was formed without having the frame between the first substrate film and the second substrate film.

A region of 155×98 mm was cut out from the obtained light absorbing body-containing film to obtain a light absorbing material-containing film 8.

Comparative Example 3

A light absorbing material-containing film was prepared in the same manner as in Example 1, except that the frame had no gas barrier properties using the following coating liquid 4 for forming a frame in place of the coating liquid 3 for forming a frame.

A region of 155×98 mm was cut out from the obtained light absorbing body-containing film to obtain a light absorbing material-containing film 9.

—Composition of Coating Liquid 4 for Forming Frame—

A coating liquid for a frame having the following composition was prepared to obtain coating liquid 4.

| | |
|---|---|
| Dicyclopentanyl acrylate (DCP: FA-513 AS, manufactured by Hitachi Chemical Co., Ltd.) | 89 parts by mass |
| YAG phosphor (ZYP 550G3 (YUJI LED (manufactured by Yuji International Co., Ltd.))) | 10 parts by mass |
| Photopolymerization initiator (IRGACURE 819, manufactured by BASF Corporation) | 1 part by mass |

In a case where the oxygen permeability of the frame was measured by the above-described method, the oxygen permeability of the frame was 50 cc/(m²·day·atm).

[Evaluation]

(Mounting on Backlight Unit)

A backlight unit was taken out by disassembling a commercially available tablet terminal comprising a blue light source in the backlight unit (trade name "Kindle (registered trademark) Fire HDX 7", manufactured by Amazon, hereinafter sometimes simply referred to as "Kindle Fire HDX 7"). Instead of Quantum Dot Enhancement Film (QDEF) which is the wavelength conversion film incorporated into the backlight unit, each of light absorbing body-containing films of Examples or Comparative Examples cut into a rectangle was incorporated as a wavelength conversion member. In this manner, a backlight unit was prepared.

The prepared backlight unit was turned on and the luminance and chromaticity were measured with a luminance meter (trade name "SR3", manufactured by Topcon Corporation) installed at a position 520 mm in the direction perpendicular to the surface of the light guide plate.

(Evaluation of In-Plane Chromaticity Unevenness)

The CIE xy chromaticity was measured by the same evaluation apparatus as in the above luminance measurement, and the chromaticity variation value Δxy from the average value of 25 points in the plane was calculated. The chromaticity variation value Δxy was evaluated based on the following evaluation standards. The in-plane 25 points were measured so as to include the central portion of the backlight and the points 5 cm inside from the four sides.

—Evaluation Standards—

A: $\Delta xy \leq 0.005$

B: $0.005 < \Delta xy \leq 0.010$

C: $0.010 < \Delta xy \leq 0.015$

D: $0.015 < \Delta xy$

There is no practical problem in a case of A to C grades.

The in-plane chromaticity unevenness was measured immediately after lighting of the backlight unit prepared above, and after lighting at 60° C., Dry 500 hours, or after 1000 hours lighting. The results are shown in Tables 1 and 2.

TABLE 1

| | | Central portion | | | | | Peripheral portion | | | | | Display unevenness | |
|---|---|---|---|---|---|---|---|---|---|---|---|---|---|
| | | Light absorption region | | Resin layer | | | Light absorption region | | Resin layer | | | | After lighting at 60° C., Dry |
| | | Depth [μm] | Width [μm] | Modulus of elasticity [GPa] | Depth [μm] | Width [μm] | Depth [μm] | Width [μm] | Modulus of elasticity [Gpa] | Depth [μm] | Width [μm] | Initial | |
| Example 1 | Light absorbing body-containing film 1 | 50 | 250 | 3 | 50 | 50 | 100 | 250 | 3 | 100 | 50 | B | C |
| Example 2 | Light absorbing body-containing film 2 | 50 | 250 | 3 | 50 | 50 | 50 | 500 | 3 | 50 | 50 | B | C |
| Comparative Example 1 | Light absorbing body-containing film 3 | 50 | 250 | 3 | 50 | 50 | 50 | 250 | 3 | 50 | 50 | D | D |

TABLE 2

| | Light absorption region First light absorbing body | Frame | | | | | |
|---|---|---|---|---|---|---|---|
| | | Number of frames | Radius of curvature | | Second light absorbing body | Width | |
| | | | Vertex portion | Foot portion | | Outermost | Middle |
| Example 3 | Quantum dots 1 and 2 | 1 | 10 μm | 10 μm | YAG phosphor | 1 mm | — |
| Example 4 | Quantum dots 1 and 2 | 3 | 10 μm | 10 μm | YAG phosphor | 0.3 mm | 0.3 mm |
| Example 5 | Quantum dots 1 and 2 | 3 | 10 μm | 10 μm | YAG phosphor | 0.6 mm | 0.3 mm |
| Example 6 | Quantum dots 1 and 2 | 1 | None | None | YAG phosphor | 1 mm | — |
| Comparative Example 2 | Quantum dots 1 and 2 | 0 | — | — | YAG phosphor | — | — |
| Comparative Example 3 | Quantum dots 1 and 2 | 1 | 10 μm | 10 μm | YAG phosphor | 1 mm | — |

| | Frame | | | | Evaluation Display unevenness | |
|---|---|---|---|---|---|---|
| | Width | Oxygen permeability cc/(m²·day·atm) | Between frames | | Initial | After aging |
| | Innermost | | Material | Width | | |
| Example 3 | — | 3 | — | — | B | B |
| Example 4 | 0.3 mm | 10 | Light absorption region | 3 mm | B | B |
| Example 5 | 0.1 mm | 5 | Light absorption region | 3 mm | A | A |
| Example 6 | — | 3 | — | — | C | C |
| Comparative Example 2 | — | — | — | — | D | D |
| Comparative Example 3 | — | 50 | — | — | C | D |

The light absorbing material-containing film 1 of Example 1 had a distribution in the thickness of the light absorption region (depth of concave portion) in the plane.

The light absorbing material-containing film 2 of Example 2 had a distribution in the size of the light absorption region (size of concave portion (width of light absorption region)) in the plane.

In the light absorbing material-containing film 3 of Comparative Example 1, the thickness of the light absorption region and the size of the light absorption region were uniform in the plane.

In Examples 1 and 2, in-plane unevenness was reduced in a case of being incorporated in a backlight, by providing a tint distribution in the film plane.

The light absorbing material-containing films 4 to 7 of Examples 3 to 6 had a frame containing a second light absorbing body, and the oxygen permeability of the frame was 20 cc/(m²·day·atm) or less.

In Examples 3 to 5, the radius of curvature of the vertex portion and the foot portion of the frame was in a range of 5 to 200 μm.

The light absorbing material-containing film 8 of Comparative Example 2 did not have a frame.

In the light absorbing material-containing film 9 of Comparative Example 3, the oxygen permeability of the frame was 50 cc/(m²·day·atm).

In Examples 3 to 6, the display unevenness at the initial stage in a case of being incorporated in the backlight and after the lighting at 60° C. and Dry 1000 hours was reduced as compared with Comparative Examples 2 and 3. Particularly, the light absorbing material-containing film 6 having a triple frame, the width of the inner frame being narrower than the outer frame, and the radius of curvature at the vertex portion and the foot portion of the frame is low of in-plane display unevenness, which is satisfactory.

From the above, the effects of the present invention are obvious.

EXPLANATION OF REFERENCES

1: light absorbing body-containing film
10, 20: substrate film
11, 21: support film
12, 22: barrier layer
30: light absorbing body-containing layer
31: light absorbing body (first light absorbing body)
32: second light absorbing body
33: binder
34: binder
35: region including light absorbing body (light absorption region)
38A: resin layer
38B: frame (resin layer)
39: resin layer
40: laminated film
100: wavelength conversion member
101A: light source
101B: light guide plate
101C: planar light source
102: backlight unit
102A: reflective plate
102B: retroreflective member
103: liquid crystal cell unit
104: liquid crystal display
110: liquid crystal cell
120, 130: polarizing plate
121, 123, 131, 133: polarizing plate protective film
122, 132: polarizer

What is claimed is:

1. A light absorbing material-containing film comprising:
   a light absorbing material-containing layer that has a plurality of cylindrical or polygonal prism-shaped resin portions discretely disposed and a light absorption region contain light absorbing bodies and formed between the plurality of resin portions;
   a first substrate film that is laminated on one main surface of the light absorbing material-containing layer; and
   a second substrate film that is laminated on the other main surface of the light absorbing material-containing layer,
   wherein the light absorption region contains a plurality of types of phosphors having different absorption wavelengths that serve as the light absorbing body, and a binder,
   the light absorption region and a part of the plurality of resin portions are exposed at a side surface of the light absorbing material-containing layer,
   the plurality of resin portions have a Young's modulus of 0.5 to 10 GPa,
   the plurality of cylindrical or polygonal prism-shaped resin portions are disposed such that a height direction of the plurality of resin portions is a thickness direction of the light absorbing material-containing layer,
   an amount ratio of the plurality of types of phosphors is constant in a plane of the light absorption region, and
   an in-plane tint distribution of the light absorbing material-containing film satisfies Formula (1), $$0.002 < y_{max} - y_{min} < 0.2 \qquad \text{Formula (1)}$$

where $y_{max}$ and $y_{min}$ respectively represent a maximum value and a minimum value of a CIE y value in a measurement of an in-plane tint of the light absorbing material-containing film.

2. The light absorbing material-containing film according to claim 1, wherein the resin portions have a height of 10 to 50 μm.

3. The light absorbing material-containing film according to claim 1, wherein a width of the resin portions is 5 to 1000 μm.

4. The light absorbing material-containing film according to claim 1, wherein the binder contains at least one of a monofunctional (meth) acrylate monomer and a polyfunctional (meth) acrylate monomer, and a thiol compound.

* * * * *